(12) United States Patent
John Wilson et al.

(10) Patent No.: US 10,979,273 B2
(45) Date of Patent: Apr. 13, 2021

(54) QUASI CO-LOCATION ASSUMPTION DURING BANDWIDTH PART SWITCHING

(71) Applicant: QUALCOMM incorporated, San Diego, CA (US)

(72) Inventors: Makesh Pravin John Wilson, San Diego, CA (US); Tao Luo, San Diego, CA (US); Peter Pui Lok Ang, San Diego, CA (US); Heechoon Lee, San Diego, CA (US); Sumeeth Nagaraja, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/298,927

(22) Filed: Mar. 11, 2019

(65) Prior Publication Data

US 2019/0296956 A1 Sep. 26, 2019

Related U.S. Application Data

(60) Provisional application No. 62/647,596, filed on Mar. 23, 2018.

(51) Int. Cl.
*H04L 27/26* (2006.01)
*H04W 64/00* (2009.01)
(Continued)

(52) U.S. Cl.
CPC ........ *H04L 27/2657* (2013.01); *H04L 1/1657* (2013.01); *H04L 5/0048* (2013.01);
(Continued)

(58) Field of Classification Search
CPC . H04L 5/0048; H04L 27/2657; H04L 5/0096; H04W 48/08; H04W 64/003
See application file for complete search history.

(56) References Cited

U.S. PATENT DOCUMENTS 10,637,550 B2 * 4/2020 Park ................... H04L 5/0048
2009/0262696 A1 * 10/2009 Wei ..................... H04L 5/0044
370/329

(Continued)

OTHER PUBLICATIONS

AT&T: "TCI States Configuration Design to Support Dynamic BWP Switching", 3GPP Draft; R1-1800582 TCI States Configuration Design to Support Dynamic BWP Switching, 3rd Generation Partnership Project (3GPP), Mobile Competence Centre, 650, Route Des Lucioles ; F-06921 Sophia-Antipolis Cedex, France, vol. RAN WG1, No. Vancouver, Canada; Jan. 22, 2018-Jan. 26, 2018, Jan. 13, 2018 (Jan. 13, 2018), 1 Page, XP051384941, Retrieved from the Internet: URL: http://www.3gpp.org/ftp/tsg_ran/WG1_RL1/TSGR1_AH/NR_AH_1801/Docs/ [retrieved on Jan. 13, 2018], Sections 1 and 2.

(Continued)

*Primary Examiner* — Syed Ali
(74) *Attorney, Agent, or Firm* — Kevin M. Donnelly

(57) ABSTRACT

Methods, systems, and devices for wireless communication are described. In some wireless communications systems, a user equipment (UE) may be configured to transition to communicating on a first bandwidth part from communicating on a second bandwidth part. In order to ensure that the UE is able to perform receiver processing for demodulating data received on the first bandwidth part, after transitioning to communicating on the first bandwidth part, the UE may be configured to perform receiver processing using reference signals received on the second bandwidth part. That is, for a configured period of time, before the UE is able to perform receiver processing for demodulating data received on the first bandwidth part using reference signals received on the first bandwidth part, the UE may perform receiver processing for demodulating data received on the first bandwidth part using reference signals received on the second bandwidth part.

45 Claims, 15 Drawing Sheets

(51) Int. Cl.
  *H04L 25/02* (2006.01)
  *H04L 5/00* (2006.01)
  *H04L 1/16* (2006.01)
  *H04W 28/20* (2009.01)
  *H04W 48/08* (2009.01)
  *H04W 72/04* (2009.01)

(52) U.S. Cl.
  CPC ......... *H04L 25/0224* (2013.01); *H04W 28/20* (2013.01); *H04W 48/08* (2013.01); *H04W 64/003* (2013.01); *H04W 72/0453* (2013.01)

(56) References Cited

U.S. PATENT DOCUMENTS

| | | | | |
|---|---|---|---|---|
| 2018/0124743 A1* | 5/2018 | Seo | ........................ | H04L 5/0092 |
| 2018/0278314 A1* | 9/2018 | Nam | .................... | H04B 7/0626 |
| 2019/0132109 A1* | 5/2019 | Zhou | ................... | H04W 72/042 |
| 2019/0132862 A1* | 5/2019 | Jeon | ....................... | H04L 5/0092 |
| 2019/0207722 A1* | 7/2019 | Gao | ..................... | H04B 7/0695 |
| 2019/0373592 A1* | 12/2019 | Ji | .......................... | H04L 5/0048 |

OTHER PUBLICATIONS

International Search Report and Written Opinion—PCT/US2019/021753—ISA/EPO—dated Jun. 3, 2019.

Qualcomm Incorporated: "Discussion on QCL", 3GPP Draft, R1-1718551, 3rd Generation Partnership Project (3GPP), Mobile Competence Centre, 650, Route Des Lucioles, F-06921 Sophia-Antipolis Cedex, France, vol. RAN WG1, No. Prague, Czech, Oct. 9, 2017-Oct. 13, 2017, Oct. 8, 2017 (Oct. 8, 2017), XP051341732, 9 Pages, Retrieved from the Internet: URL: https://www.3gpp.org/ftp/Meetings_3GPP_SYNC/RAN1/Docs/[retrieved on Oct. 8, 2017], Section 1 and 2.3.

Vivo: "Remaining Issues on Beam Measurement and Reporting", 3GPP Draft; R1-1801520 Remaining Issues on Beam Measurement and Reporting, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 15, 2018 (Feb. 15, 2018), 7 Pages, XP051396772, Retrieved from the Internet: URL: http://www.3gpp.org/ftp/tsg_ran/WG1_RL1/TSGR1_92/Docs [retrieved on Feb. 15, 2018], Sections 1 and 2.2.1.

* cited by examiner

QUASI CO-LOCATION ASSUMPTION DURING BANDWIDTH PART SWITCHING

CROSS REFERENCES

The present Application for Patent claims the benefit of U.S. Provisional Patent Application No. 62/647,596 by JOHN WILSON, et al., entitled "QUASI CO-LOCATION ASSUMPTION DURING BANDWIDTH PART SWITCHING," filed Mar. 23, 2018, assigned to the assignee hereof, and expressly incorporated herein.

BACKGROUND

The following relates generally to wireless communication and more specifically to quasi co-location (QCL) assumption during bandwidth part switching.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may communicate with a UE using multiple antennas. Data streams may be mapped to one or more antennas using antenna ports, and each of these antenna ports may be associated with a reference signal (e.g., which may allow a receiver to distinguish data streams associated with different antenna ports in a received transmission). In some cases, some antenna ports may be referred to as quasi co-located, meaning that the properties of a channel (e.g., spatial receive properties) over which a symbol is conveyed on one antenna port may be inferred from the properties of a channel over which another symbol is conveyed on another antenna port. This implicit relationship between antenna ports may improve the chances that a UE is able to successfully decode a downlink transmission. For example, a receiving device (e.g., a UE) may be able to perform receiver processing (e.g., including channel estimation and spatial filtering) for demodulating data received on a first set of antenna ports based on reference signals received on a second set of antenna ports that are quasi co-located with the first set of antenna ports. Current techniques for performing receiver processing based on QCL relationships between antenna ports, in certain instances, may be deficient.

SUMMARY

The described techniques relate to improved methods, systems, devices, or apparatuses that support determining suitable quasi co-location (QCL) assumptions during bandwidth part switching. The examples described herein provide a procedure for enabling a user equipment (UE) to determine QCL assumptions after transitioning from communicating in one bandwidth part (e.g., a sub-band of a system bandwidth) to another bandwidth part. In particular, the UE may be configured to perform receiver processing (e.g., including channel estimation and spatial filtering) for demodulating data received on a channel based on a QCL assumption of antenna ports used to transmit the data on the channel and antenna ports used to transmit reference signals to the UE. The QCL assumption may indicate that the antenna ports used to transmit the data on a first bandwidth part on the channel are quasi co-located with antenna ports used to transmit reference signals on a second bandwidth part. Thus, for a configured period of time, before the UE is able to perform receiver processing on a first bandwidth part using reference signals received on the first bandwidth part, the UE may perform receiver processing on the first bandwidth part using reference signals received on the second bandwidth part.

A method for wireless communication is described. The method may include receiving an indicator indicating to derive a QCL assumption for a demodulation reference signal (DMRS) for a first bandwidth part from a reference signal of a second bandwidth part, receiving a grant in the second bandwidth part instructing the UE to switch from the second bandwidth part to the first bandwidth part, and demodulating, based at least in part on the QCL assumption, a transmission in the first bandwidth part received within a transition time window occurring after the UE receives the grant.

An apparatus for wireless communication is described. The apparatus may include means for receiving an indicator indicating to derive a QCL assumption for a DMRS for a first bandwidth part from a reference signal of a second bandwidth part, means for receiving a grant in the second bandwidth part instructing the UE to switch from the second bandwidth part to the first bandwidth part, and means for demodulating, based at least in part on the QCL assumption, a transmission in the first bandwidth part received within a transition time window occurring after the UE receives the grant.

Another apparatus for wireless communication is described. The apparatus may include a processor, memory in electronic communication with the processor, and instructions stored in the memory. The instructions may be operable to cause the processor to receive an indicator indicating to derive a QCL assumption for a DMRS for a first bandwidth part from a reference signal of a second bandwidth part, receive a grant in the second bandwidth part instructing the UE to switch from the second bandwidth part to the first bandwidth part, and demodulate, based at least in part on the QCL assumption, a transmission in the first bandwidth part received within a transition time window occurring after the UE receives the grant.

A non-transitory computer-readable medium for wireless communication is described. The non-transitory computer-readable medium may include instructions operable to cause a processor to receive an indicator indicating to derive a QCL assumption for a DMRS for a first bandwidth part from a reference signal of a second bandwidth part, receive a grant in the second bandwidth part instructing the UE to switch from the second bandwidth part to the first bandwidth part, and demodulate, based at least in part on the QCL assumption, a transmission in the first bandwidth part received within a transition time window occurring after the UE receives the grant.

In some examples of the method, apparatus, and non-transitory computer-readable medium described above, the indicator indicates that the reference signal of the second bandwidth part is cross bandwidth part quasi co-located with a second reference signal of the first bandwidth part. Some examples of the method, apparatus, and non-transitory computer-readable medium described above may further include processes, features, means, or instructions for filtering the reference signal and the second reference signal across the first and second bandwidth parts to determine a QCL parameter, where the transmission in the first bandwidth part may be demodulated based at least in part on the QCL parameter. In some examples of the method, apparatus, and non-transitory computer-readable medium described above, the indicator indicates that the reference signal of the second bandwidth part is not cross bandwidth part quasi co-located with a second reference signal of the first bandwidth part. Some examples of the method, apparatus, and non-transitory computer-readable medium described above may further include processes, features, means, or instructions for determining not to filter the reference signal and the second reference signal across the first and second bandwidth parts.

Some examples of the method, apparatus, and non-transitory computer-readable medium described above may further include processes, features, means, or instructions for determining that the transition time window may have expired. Some examples of the method, apparatus, and non-transitory computer-readable medium described above may further include processes, features, means, or instructions for deriving a second QCL assumption for the DMRS for the first bandwidth part from a reference signal of the first bandwidth part. Some examples of the method, apparatus, and non-transitory computer-readable medium described above may further include processes, features, means, or instructions for demodulating, after the transition time window may have expired, a second transmission in the first bandwidth part based at least in part on the second QCL assumption.

In some examples of the method, apparatus, and non-transitory computer-readable medium described above, the QCL assumption indicates to derive a QCL parameter for the first bandwidth part based at least in part on the reference signal of the second bandwidth part, and where the transmission in the first bandwidth part may be demodulated based at least in part on the QCL parameter. In some examples of the method, apparatus, and non-transitory computer-readable medium described above, the QCL parameter may be a delay spread parameter, a Doppler parameter, an average delay parameter, a Doppler shift parameter, a spatial receive parameter, or any combination thereof. Some examples of the method, apparatus, and non-transitory computer-readable medium described above may further include processes, features, means, or instructions for receiving radio resource control signaling, or downlink control information, or a control element that indicates a duration of the transition time window. In some examples of the method, apparatuses, and non-transitory computer-readable medium described herein the duration of the transition time window corresponds to a duration of a first data channel on the first bandwidth part, the first data channel comprising the transmission in the first bandwidth part.

Some examples of the method, apparatus, and non-transitory computer-readable medium described above may further include processes, features, means, or instructions for receiving radio resource control signaling, or downlink control information, or a control element that indicates whether the reference signal of the second bandwidth part may be cross bandwidth part quasi co-located with a second reference signal of the first bandwidth part. In some examples of the method, apparatus, and non-transitory computer-readable medium described above, the UE locally stores a duration of the transition time window. In some examples of the method, apparatus, and non-transitory computer-readable medium described above, a duration of the transition time window may be a function of a periodicity of a second reference signal of the first bandwidth part.

In some examples of the method, apparatus, and non-transitory computer-readable medium described above, the reference signal may be a channel state information reference signal (CSI-RS), a synchronization signal block (SSB), or a tracking reference signal (TRS). In some examples of the method, apparatus, and non-transitory computer-readable medium described above, the indicator may be a transmission configuration indicator (TCI) that indicates a QCL parameter set from a plurality of different QCL parameter sets. Some examples of the method, apparatus, and non-transitory computer-readable medium described above may further include processes, features, means, or instructions for deriving a TCI state for the first bandwidth part based at least in part on a configured TCI state for the second bandwidth part.

Some examples of the method, apparatus, and non-transitory computer-readable medium described above may further include processes, features, means, or instructions for receiving configuration information configuring the UE to utilize a first TCI state for the first bandwidth part of a plurality of different TCI states, and where each TCI state of the plurality of TCI states identifies at least one reference signal and includes a parameter for a receive beam configured for receiving a direction transmission in the second bandwidth part. Some examples of the method, apparatus, and non-transitory computer-readable medium described above may further include processes, features, means, or instructions for receiving the transmission in the first bandwidth part in accordance with the first TCI state.

Some examples of the method, apparatus, and non-transitory computer-readable medium described above may further include processes, features, means, or instructions for receiving, prior to the grant, a control element configuring the UE to utilize a TCI interpretation in the second bandwidth part. Some examples of the method, apparatus, and non-transitory computer-readable medium described above may further include processes, features, means, or instructions for determining that an application time of the control element occurs within the transition time window. Some examples of the method, apparatus, and non-transitory computer-readable medium described above may further include processes, features, means, or instructions for receiving the transmission in the first bandwidth part in accordance with the TCI interpretation.

Some examples of the method, apparatus, and non-transitory computer-readable medium described above may further include processes, features, means, or instructions for receiving, prior to the grant, a control element configuring the UE to utilize a transmission configuration indicator (TCI) interpretation in the second bandwidth part. Some examples of the method, apparatus, and non-transitory computer-readable medium described above may further include processes, features, means, or instructions for determining whether to apply or reject the TCI interpretation for transmissions received in the first bandwidth part during the transition time window based at least in part on an application time of the control element extending after the transition time window. Some examples of the method, apparatus, and non-transitory computer-readable medium described above may further include processes, features, means, or instructions for monitoring a shared data channel or a control channel of the first bandwidth part for the transmission.

In some examples of the method, apparatus, and non-transitory computer-readable medium described above, the transmission may be a control resource set (coreset), and demodulating the transmission in the first bandwidth part during the transition time window further includes demodulating the coreset in the first bandwidth part based at least in part on the QCL assumption. In some examples of the method, apparatus, and non-transitory computer-readable medium described above, the transmission may be a first coreset, and where demodulating the transmission in the first bandwidth part during the transition time window further comprises: mapping the first coreset and a second coreset in the first bandwidth part. Some examples of the method, apparatus, and non-transitory computer-readable medium described above may further include processes, features, means, or instructions for demodulating the first coreset and the second coreset based at least in part on the QCL assumption and the mapping.

A method for wireless communication is described. The method may include transmitting, to a UE, an indicator indicating to derive a QCL assumption for a DMRS for a first bandwidth part from a reference signal of a second bandwidth part, transmitting a grant in the second bandwidth part instructing the UE to switch from the second bandwidth part to the first bandwidth part, generating a transmission in accordance with the QCL assumption, and transmitting the transmission in the first bandwidth part during a transition time window occurring after the UE is instructed to switch from the second bandwidth part to the first bandwidth part.

An apparatus for wireless communication is described. The apparatus may include means for transmitting, to a UE, an indicator indicating to derive a QCL assumption for a DMRS for a first bandwidth part from a reference signal of a second bandwidth part, means for transmitting a grant in the second bandwidth part instructing the UE to switch from the second bandwidth part to the first bandwidth part, means for generating a transmission in accordance with the QCL assumption, and means for transmitting the transmission in the first bandwidth part during a transition time window occurring after the UE is instructed to switch from the second bandwidth part to the first bandwidth part.

Another apparatus for wireless communication is described. The apparatus may include a processor, memory in electronic communication with the processor, and instructions stored in the memory. The instructions may be operable to cause the processor to transmit, to a UE, an indicator indicating to derive a QCL assumption for a DMRS for a first bandwidth part from a reference signal of a second bandwidth part, transmit a grant in the second bandwidth part instructing the UE to switch from the second bandwidth part to the first bandwidth part, generate a transmission in accordance with the QCL assumption, and transmit the transmission in the first bandwidth part during a transition time window occurring after the UE is instructed to switch from the second bandwidth part to the first bandwidth part.

A non-transitory computer-readable medium for wireless communication is described. The non-transitory computer-readable medium may include instructions operable to cause a processor to transmit, to a UE, an indicator indicating to derive a QCL assumption for a DMRS for a first bandwidth part from a reference signal of a second bandwidth part, transmit a grant in the second bandwidth part instructing the UE to switch from the second bandwidth part to the first bandwidth part, generate a transmission in accordance with the QCL assumption, and transmit the transmission in the first bandwidth part during a transition time window occurring after the UE is instructed to switch from the second bandwidth part to the first bandwidth part.

Some examples of the method, apparatus, and non-transitory computer-readable medium described above may further include processes, features, means, or instructions for determining that the transition time window may have expired. Some examples of the method, apparatus, and non-transitory computer-readable medium described above may further include processes, features, means, or instructions for generating a second transmission in accordance a second QCL assumption corresponding to the first bandwidth part. Some examples of the method, apparatus, and non-transitory computer-readable medium described above may further include processes, features, means, or instructions for transmitting, after the transition time window may have expired, the second transmission in the first bandwidth part.

Some examples of the method, apparatus, and non-transitory computer-readable medium described above may further include processes, features, means, or instructions for transmitting radio resource control signaling, or downlink control information, or a control element that indicates a duration of the transition time window. Some examples of the method, apparatus, and non-transitory computer-readable medium described above may further include processes, features, means, or instructions for transmitting radio resource control signaling, or downlink control information, or a control element that indicates whether the reference signal of the second bandwidth part may be cross bandwidth part quasi co-located with a second reference signal of the first bandwidth part.

Some examples of the method, apparatus, and non-transitory computer-readable medium described above may further include processes, features, means, or instructions for transmitting the reference signal in the second bandwidth part. Some examples of the method, apparatus, and non-transitory computer-readable medium described above may further include processes, features, means, or instructions for transmitting a second reference signal in the first bandwidth part. In some examples of the method, apparatus, and non-transitory computer-readable medium described above, the reference signal may be a CSI-RS, an SSB, or a tracking reference signal.

DETAILED DESCRIPTION

Figure 1:
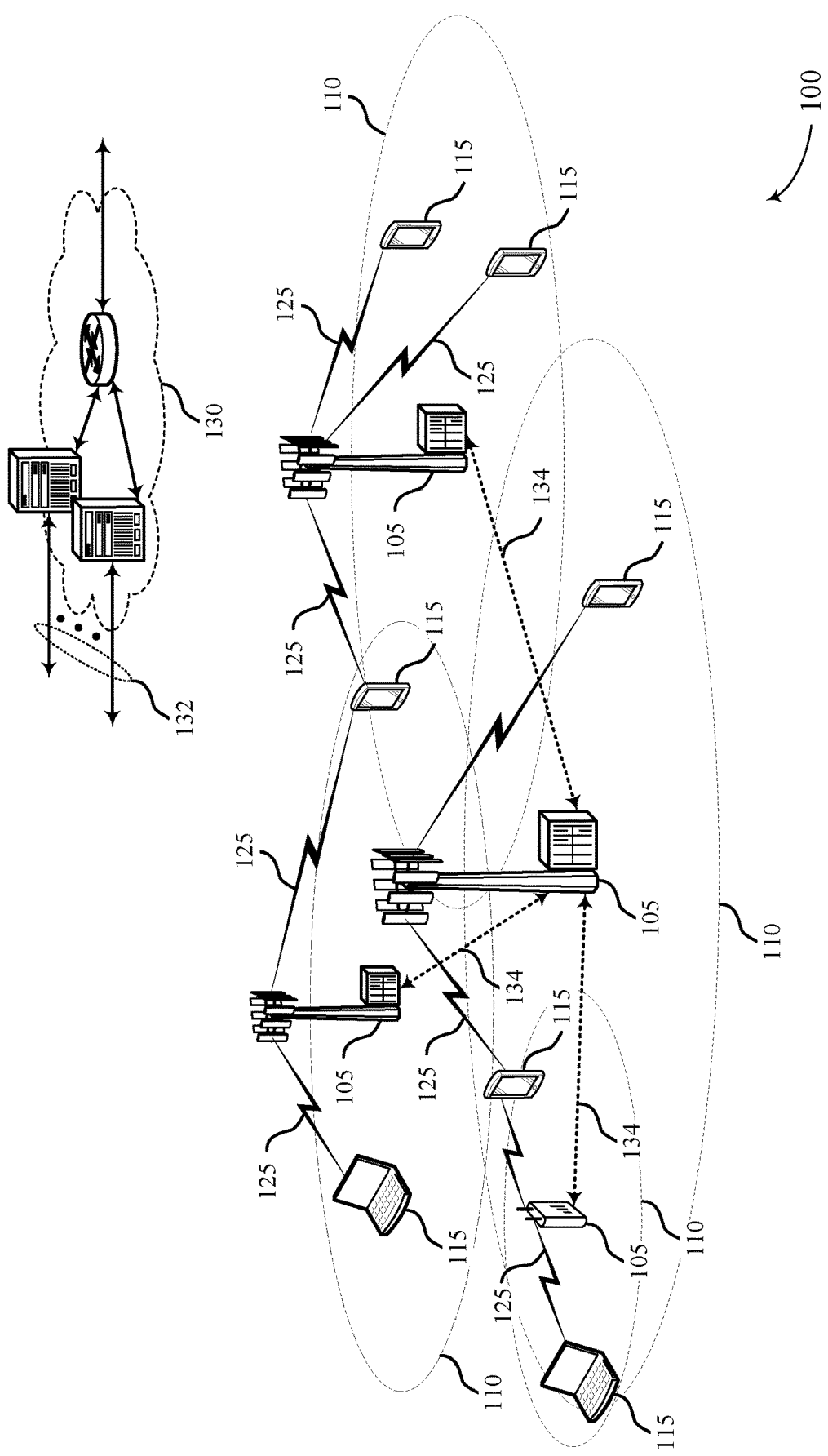
FIGS. 1 and 2 illustrate examples of wireless communications systems that support quasi co-location (QCL) assumption during bandwidth part switching in accordance with aspects of the present disclosure.

The described techniques relate to improved methods, systems, devices, or apparatuses that support determining suitable quasi co-location (QCL) assumptions during bandwidth part switching. The examples described herein provide a procedure for enabling a user equipment (UE) to determine QCL assumptions after transitioning from communicating in one bandwidth part (e.g., a sub-band of a system bandwidth) to another bandwidth part. In particular, the UE may be configured to perform receiver processing (e.g., including channel estimation and spatial filtering) for demodulating data received on a channel based on a QCL assumption of antenna ports used to transmit the data on the channel and antenna ports used to transmit reference signals to the UE. The QCL assumption may indicate that the antenna ports used to transmit the data on a first bandwidth part on the channel are quasi co-located with antenna ports used to transmit reference signals on a second bandwidth part. Thus, for a configured period of time, before the UE is able to perform receiver processing on a first bandwidth part using reference signals received on the first bandwidth part, the UE may perform receiver processing on the first bandwidth part using reference signals received on the second bandwidth part.

In some wireless communications systems, a base station may communicate with a user equipment (UE) using multiple antennas. For example, a base station may transmit parallel data streams over respective antennas in order to increase throughput (e.g., as opposed to transmitting the data streams sequentially over the same antenna). Additionally, or alternatively, a base station may transmit a given data stream over multiple antennas simultaneously (e.g., to increase the diversity of the transmissions). In some cases, the use of multiple antennas may be based on the use of one or more antenna ports. An antenna port is a logical entity used to map data streams to antennas. A given antenna port may drive transmissions from one or more antennas (e.g., and resolve signal components received over one or more antennas). Each antenna port may be associated with a reference signal (e.g., which may allow a receiver to distinguish data streams associated with the different antenna ports in a received transmission).

Some antenna ports may be referred to as quasi co-located, meaning that the properties of a channel (e.g., spatial receive properties) over which a symbol is conveyed on one antenna port may be inferred from the properties of a channel over which another symbol is conveyed on another antenna port. Accordingly, a receiving device (e.g., a UE) may be able to perform receiver processing for demodulating data or control information received on a first set of antenna ports based on reference signals received on a second set of antenna ports that are quasi co-located with the first set of antenna ports. Thus, a quasi co-location (QCL) relationship between antenna ports (also referred to as a QCL assumption when the QCL relationship is assumed) may improve the chances that a UE may be able to successfully decode a downlink transmission from a base station. In some cases, it may be appropriate for a base station to transmit, to a UE, an indication of which antenna ports are quasi co-located such that the UE may be able to identify additional reference signals to use for receiver processing.

In some aspects, a base station may configure a set of transmission configuration indication (TCI) states to use to indicate, to a UE, QCL relationships between antenna ports used for transmitting downlink signals to the UE. Each TCI state may be associated with a set of reference signals (e.g., synchronization signal blocks (SSBs), different types of channel state information reference signals (CSI-RSs), or tracking reference signals (TRSs)), and the TCI state may indicate a QCL relationship between antenna ports used to transmit these reference signals and antenna ports used to transmit data or control information to a UE. As such, when a UE receives an indication of a particular TCI state from a base station (e.g., in downlink control information (DCI) in a transmission time interval (TTI)), the UE may identify that antenna ports used to transmit the reference signals associated with the TCI state are quasi co-located with antenna ports used to transmit data and control information to the UE. Thus, the UE may use the reference signals associated with the TCI state to perform receiver processing for demodulating data or control information received from the base station.

In some wireless communications systems, a UE may be configured to transition from one bandwidth part (e.g., a sub-band of a system bandwidth) to another bandwidth part for receiving data from a base station. In such cases, the UE may receive an indication of a TCI state (e.g., in DCI) that indicates the reference signals for the UE to use to perform receiver processing for demodulating the data to be received from the base station on the other bandwidth part. In some aspects, however, the data to be received by the UE may be scheduled to be transmitted by the base station before any reference signals are transmitted on the other bandwidth part. As a result, the UE may not be able to perform receiver processing (e.g., to determine the properties of the channel, such as spatial properties, delay spread, Doppler effect, etc.), and the UE may not be able to correctly demodulate the data received on the channel, which may be detrimental to a wireless communications system.

As described herein, a wireless communications system may support efficient techniques for configuring a UE to perform receiver processing for demodulating data received on the channel based on an appropriate QCL assumption, after the UE transitions to a first bandwidth part from a second bandwidth part to receive the data. In particular, the UE may identify a QCL assumption that indicates that antenna ports used to transmit the data on the first bandwidth part are quasi co-located with antenna ports used to transmit reference signals on the second bandwidth part. Thus, for a configured period of time (i.e., a transition time window), before the UE is able to perform receiver processing on a first bandwidth part using reference signals received on the first bandwidth part, the UE may perform receiver processing on the first bandwidth part using reference signals received on the second bandwidth part. The UE may then demodulate data received on the first bandwidth part based on performing the receiver processing. After the transition time window expires, the UE may perform receiver processing for demodulating data received on the first bandwidth part using reference signals received on the first bandwidth part.

Because the techniques described above allow a UE to perform receiver processing for receiving data immediately after transitioning to communicating (i.e., receiving control and data from a base station) on the first bandwidth part, as opposed to the UE being unable to perform receiver processing for demodulating data received on the first bandwidth part immediately after transitioning to the first bandwidth part (i.e., using conventional techniques), the channel efficiency in a wireless communications system may increase. Aspects of the disclosure introduced above are described below in the context of a wireless communications system. Examples of processes and signaling exchanges that support QCL assumptions during bandwidth part switching are then described. Aspects of the disclosure are further illustrated by and described with reference to apparatus diagrams, system diagrams, and flowcharts that relate to QCL assumptions during bandwidth part switching.

FIG. 1 illustrates an example of a wireless communications system 100 that supports QCL assumptions during bandwidth part switching in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Wireless communications system 100 may operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than ultra-high frequency (UHF) antennas. In some cases, this may facilitate use of antenna arrays within a UE 115. However, the propagation of EHF transmissions may be subject to even greater atmospheric attenuation and shorter range than super high frequency (SHF) or UHF transmissions. Techniques disclosed herein may be employed across transmissions that use one or more different frequency regions, and designated use of bands across these frequency regions may differ by country or regulating body.

In some cases, UEs 115 and base stations 105 may support retransmissions of data to increase the likelihood that data is received successfully. HARQ feedback is one technique of increasing the likelihood that data is received correctly over a communication link 125. HARQ may include the transmission of an acknowledgement (ACK) or a negative acknowledgement (NACK) by a receiving device to a transmitting device to indicate to the transmitting device whether a transmission was successfully received. HARQ may also include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams.

Different spatial layers may be associated with different antenna ports used for channel measurement and reporting. An antenna port is a logical entity used to map data streams to antennas. A given antenna port may drive transmissions from one or more antennas (e.g., and resolve signal components received over one or more antennas). Each antenna port may be associated with a reference signal (e.g., which may allow the receiver to distinguish data streams associated with the different antenna ports in a received transmission). In some cases, some antenna ports may be referred to as quasi co-located, meaning that the properties of a channel (e.g., spatial receive properties) over which a symbol is conveyed on one antenna port may be inferred from the properties of a channel over which another symbol is conveyed on another antenna port.

Accordingly, if a first set of antenna ports is quasi co-located with a second set of antenna ports, a UE 115 may be able to perform receiver processing for demodulating data or control information received on the first set of antenna ports based on reference signals received on the second set of antenna ports. For example, the UE 115 may be able to determine a delay spread, a Doppler shift, etc. associated with a downlink transmission of data or control information on the first set of antenna ports based on the reference signals received on the second set of antenna ports.

The UE 115 may then use, for example, a channel estimate (i.e., determined based on performing receiver processing as described above) to correctly demodulate a downlink transmission from a base station 105. Thus, a QCL relationship between antenna ports used for downlink communications between a base station 105 and a UE 115 may improve the chances that the UE 115 may be able to successfully decode a downlink transmission from the base station 105. As such, it may be appropriate for a base station to transmit, to a UE, an indication of which antenna ports are quasi co-located such that the UE may be able to identify additional reference signals to use for receiver processing.

Accordingly, a base station 105 may configure a set of TCI states that correspond to different QCL relationships between antenna ports used for communication with a UE 115. A TCI state may be associated with a set of reference signals (e.g., SSBs, TRSs, different types of CSI-RSs), and the TCI state may indicate a QCL relationship between antenna ports used to transmit these reference signals and antenna ports used to transmit data or control information to a UE 115. As such, when a UE 115 receives an indication of a particular TCI state from a base station 105 (e.g., in DCI in a TTI), the UE 115 may identify that antenna ports used to transmit the reference signals associated with the TCI state are quasi co-located with antenna ports used to transmit data and control information to the UE 115. Thus, the UE 115 may use the reference signals associated with the TCI state to perform receiver processing for demodulating data or control information received from the base station 105. For example, the UE 115 may determine a delay spread, Doppler shift, Doppler spread, a Doppler average, delay receive parameter(s), spatial receive parameter(s), etc., associated with a transmission of data or control information based on the reference signals associated with the TCI state.

In wireless communications system 100, UE 115 may be configured to transition from communicating on one bandwidth part (e.g., a sub-band of a system bandwidth) to communicating on another bandwidth part. For instance the UE 115 may be configured to switch to a different bandwidth part for receiving data from a base station 105 after a timer expires, or the UE 115 may be configured to switch to a different bandwidth part for receiving data from a base station 105 based on a DCI grant that allocates resources for a downlink transmission from the base station 105 on the different bandwidth part. In such cases, the UE 115 may receive an indication of (or otherwise identify) a TCI state that indicates the reference signals for the UE 115 to use to perform receiver processing for demodulating the data to be received from base station 105 on the different bandwidth part. In some aspects, however, the data to be received by the UE 115 may be scheduled to be transmitted before any reference signals in the different bandwidth part. As a result, UE 115 may not be able to perform receiver processing (e.g., to determine the properties of the channel, such as spatial properties, delay spread, Doppler effect, etc.), and the UE 115 may not be able to correctly demodulate the data received on the channel, which may be detrimental to a wireless communications system. Wireless communications system 100 may support efficient techniques for configuring UE 115 to perform receiver processing for demodulating data received on the channel based on an appropriate QCL assumption.

Figure 2:
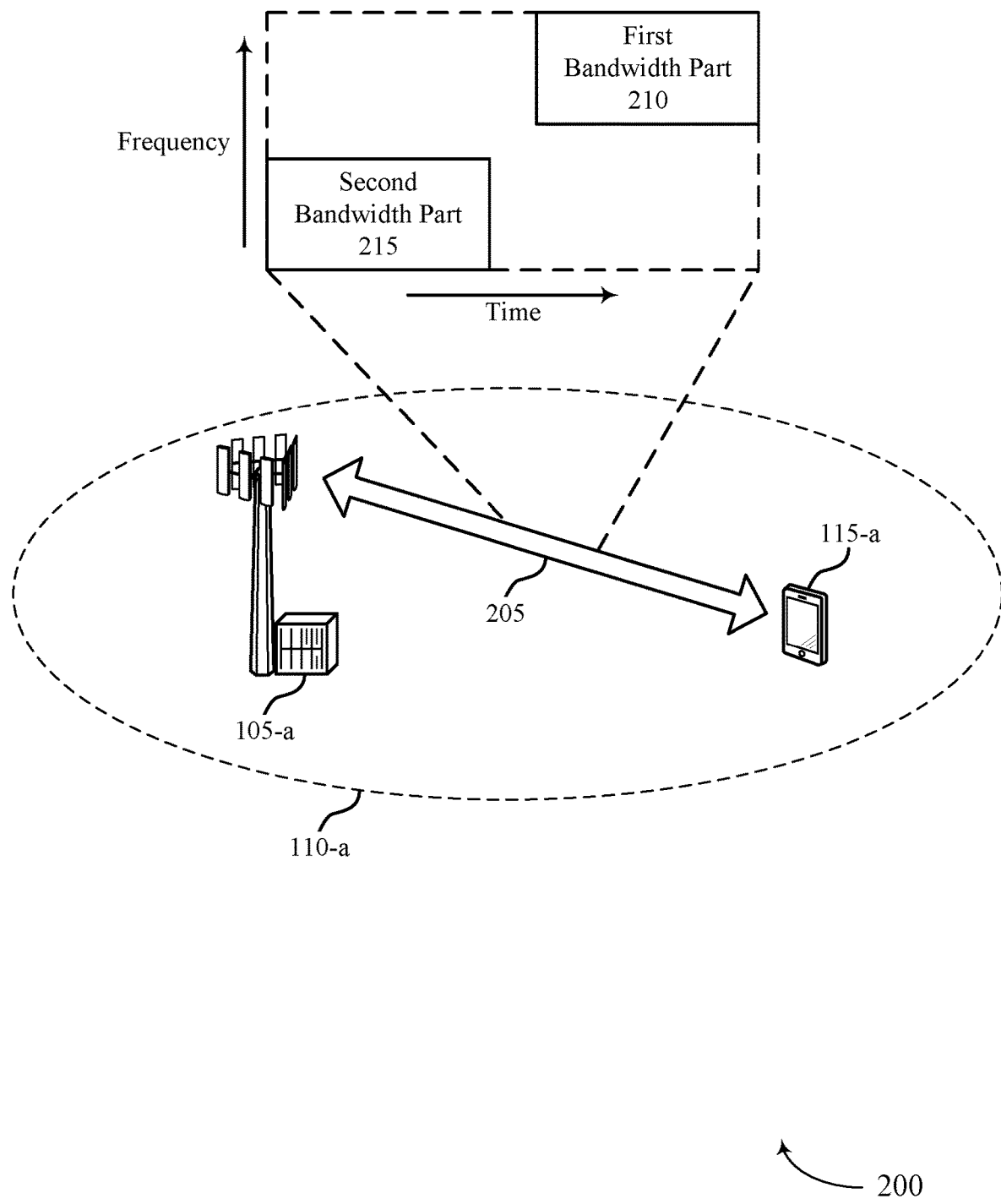

FIG. 2 illustrates an example of a wireless communications system 200 that supports QCL assumption during bandwidth part switching in accordance with various aspects of the present disclosure. Wireless communications system 200 includes base station 105-*a* and UE 115-*a*, which may be examples of the corresponding devices described with reference to FIG. 1. Base station 105-*a* may communicate with UEs 115 (including UE 115-*a*) within coverage area 110-*a*. For example, base station 105-*a* may communicate with UE 115-*a* on resources of a carrier 205. Carrier 205 may include a first bandwidth part 210 and a second bandwidth part 215 (e.g., configured for communication between base station 105-*a* and UE 115-*a*). Thus, base station 105-*a* may communicate with UE 115-*a* on the first bandwidth part 210 and the second bandwidth part 215.

In some cases, as discussed with reference with FIG. 1, after communicating with base station 105-*a* on second bandwidth part 215 for a period of time, UE 115-*a* may be configured to transition to first bandwidth part 210 for communicating with base station 105-*a*. For example, base station 105-*a* may configure UE 115-*a* to transition from second bandwidth part 215 to first bandwidth part 210 to receive a downlink transmission after a timer expires. Alternatively, base station 105-*a* may transmit a DCI message on second bandwidth part 215 to schedule a downlink transmission to UE 115-*a* on first bandwidth part 210. In such cases, however, UE 115-*a* may not be able to perform receiver processing for receiving the data on first bandwidth part 210 since UE 115-*a* may not receive any reference signals from base station 105-*a* on first bandwidth part 210 before the downlink transmission.

Figure 3:
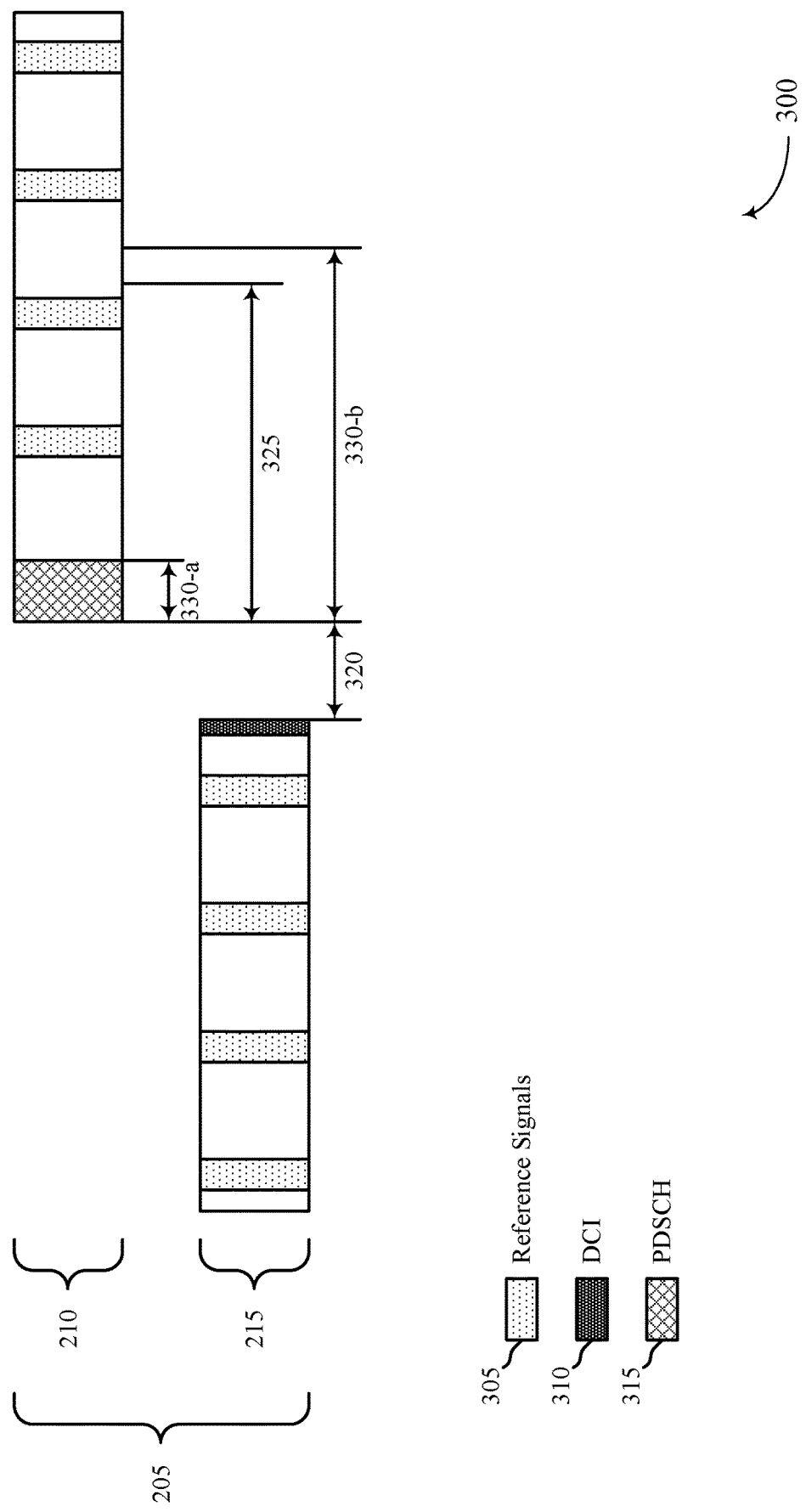
FIG. 3 illustrates an example timeline of communications between a base station and a user equipment (UE) in accordance with aspects of the present disclosure.

As described herein, wireless communications system 200 may support efficient techniques for configuring UE 115-*a* to perform receiver processing for demodulating a downlink transmission on first bandwidth part 210 after transitioning from communicating with base station 105-*a* on second bandwidth part 215. In particular, to allow UE 115-*a* to perform receiver processing for receiving data on the first bandwidth part 210 without first receiving reference signals on first bandwidth part 210, UE 115-*a* may be configured to perform receiver processing for demodulating data received on the first bandwidth part 210 based on reference signals received on the second bandwidth part 215. FIG. 3 illustrates an example timeline 300 of communications between base station 105-*a* and UE 115-*a*, where UE 115-*a* performs receiver processing for demodulating data received on the first bandwidth part 210 after transitioning from communicating with base station 105-*a* on second bandwidth part 215.

In the example of FIG. 3, base station 105-*a* may communicate with UE 115-*a* on a second bandwidth part 215 for a certain period of time. During this time, base station 105-*a* may transmit reference signals 305 to UE 115-*a* on second bandwidth part 215 (e.g., synchronization signal blocks (SSBs), channel state information reference signals (CSI-RSs), or tracking reference signals (TRSs)) which UE 115-*a* may use to perform receiver processing for demodulating downlink transmissions received on second bandwidth part 215. After communicating with UE 115-*a* on second bandwidth part 215 for a period of time, base station 105-*a* may determine to transmit data to UE 115-*a* in a physical downlink shared channel (PDSCH) 315 on a first bandwidth part 210. As such, base station 105-*a* may transmit DCI 310 on the second bandwidth part 215 to UE 115-*a* to schedule a downlink transmission of the data in the PDSCH 315 on first bandwidth part 210. In some examples, DCI 310 may also indicate a duration of the PDSCH 315, a duration of a transition time window 330, or both. The data may be scheduled to be transmitted in the PDSCH after a preconfigured number of slots 320 (e.g., K0) following the DCI 310, such that UE 115-*a* may have time to transition from communicating on the second bandwidth part to communicating on the first bandwidth part 210 (e.g., where K0>=transition time).

Once UE 115-a receives the DCI 310, UE 115-a may identify the resources allocated for the downlink transmission in PDSCH 315, and UE 115-a may receive the downlink transmission in PDSCH 315 from base station 105-a on first bandwidth part 210 (i.e., after the number of slots 320). Using the techniques described herein, UE 115-a may perform receiver processing using the reference signals 305 received on second bandwidth part 215 to demodulate the data received in PDSCH 315 on first bandwidth part 210 (e.g., regardless of whether first bandwidth part 210 is configured for single-beam transmissions or multi-beam transmissions). Accordingly, UE 115-a may be able to demodulate the data received in PDSCH 315 on first bandwidth part 210 without first receiving any reference signals on first bandwidth part 210.

UE 115-a may also perform receiver processing using the reference signals 305 received on second bandwidth part 215 to demodulate any data transmission received in a transition window 330 (e.g., a transition window 330-a or a transition window 330-b). In some examples, the transition window may be a transition window 330-a which may correspond to a length of PDSCH 315. For example, the transition window 330-a may span a duration of the first PDSCH 315 on the first bandwidth part 210, and UE 115-a may use reference signals 305 received on the second bandwidth part 215 to demodulate the first PDSCH 315 (e.g., only the first PDSCH 315 and no subsequent PDSCH on the first bandwidth part 210). In some examples, the UE 115-a may then use an indication of a TCI state received in the first PDSCH 315 to demodulate further data received on the first bandwidth part 210 after the transition window 330.

In other examples, the transition window may be a transition window 330-b which may span a period of time 325 (e.g., a warmup time) taken by UE 115-a to identify, for example, a suitable channel estimate for demodulating data received on first bandwidth part 210 (e.g., based on reference signals 305 received on first bandwidth part 210). Thus, UE 115-a may use reference signals 305 received on second bandwidth part 215 to demodulate data received on first bandwidth part 210 during transition window 330-b, and UE 115-a may use reference signals 305 received on first bandwidth part 210 to demodulate data received on first bandwidth part 210 after transition window 330-b.

Further, UE 115-a may also use the techniques described above for demodulating control information received in a physical downlink control channel (PDCCH) or a control resource set (coreset). Specifically, UE 115-a may be configured to perform receiver processing for demodulating control information received in transition window 330 using reference signals received on second bandwidth part 215. In some examples, the reference signals 305 used to perform receiver processing for demodulating control information received in a particular coreset on first bandwidth part 210 may be the same reference signals used to perform receiver processing for demodulating control information received in a corresponding coreset on second bandwidth part 215. Alternatively (e.g., when the number of coresets with control information in first bandwidth part 210 is greater than the number of coresets with control information in second bandwidth part 215), the reference signals 305 used to perform receiver processing for demodulating control information received in a particular coreset on first bandwidth part 210 may be the same reference signals used to perform receiver processing for demodulating control information received in another coreset on first bandwidth part 210 (i.e., the coresets may be mapped for receiver processing).

Although UE 115-a may be configured to perform receiver processing for demodulating data received in transition window 330 on first bandwidth part 210 using reference signals received on second bandwidth part 215, UE 115-a may, in some cases, still receive an indication of a TCI state that indicates reference signals for the UE 115-a to use to perform receiver processing in first bandwidth part 210. For instance, certain bandwidth parts may be configured with DCI including a TCI field (e.g., including three or another number of TCI bits) and other bandwidth parts may be configured with DCI not including a TCI field. This configuration of whether DCI messages in certain bandwidth parts include DCI with TCI may be indicated using higher layer signaling (e.g., using a TCI-presentInDCI flag in a bandwidth part-specific RRC parameter). Accordingly, it may be appropriate for UE 115-a to be able to interpret DCI received in first bandwidth part 210 and second bandwidth part 215 to identify the appropriate reference signals for performing receiver processing in the first bandwidth part 210.

In one aspect, when no TCI fields are included in the DCI configured to be transmitted in second bandwidth part 215 and no TCI fields are included in the DCI configured to be transmitted in first bandwidth part 210, UE 115-a may use the same reference signals for performing receiver processing for transmissions on first bandwidth part 210 as the reference signals used to perform receiver processing for transmissions on second bandwidth part 215 (e.g., based on TCI states configured by higher layer signaling). In another aspect, when no TCI field is included in the DCI configured to be transmitted in second bandwidth part 215 and a TCI field is included in the DCI configured to be transmitted in first bandwidth part 210, UE 115-a may use the same reference signals for performing receiver processing for transmissions on first bandwidth part 210 as the reference signals used to perform receiver processing for transmissions on second bandwidth part 215 during transition window 330, and UE 115-a may use the reference signals indicated by the TCI field in the DCI on first bandwidth part 210 to perform receiver processing for transmissions on first bandwidth part 210 after transition window 330.

In yet another aspect, when a TCI field is included in the DCI configured to be transmitted in second bandwidth part 215 and no TCI field is included in the DCI configured to be transmitted in first bandwidth part 210, UE 115-a may use the same reference signals for performing receiver processing for transmissions on first bandwidth part 210 during the transition window 330 as the reference signals used to perform receiver processing for transmissions on second bandwidth part 215 (e.g., as indicated by a TCI field in DCI received on second bandwidth part 215), and, after the transition window, UE 115-a may use different reference signals for performing receiver processing for transmissions on first bandwidth part 210 (e.g., based on TCI states configured by higher layers). In yet another aspect, when a TCI field is included in the DCI configured to be transmitted in second bandwidth part 215 and a TCI field is included in the DCI configured to be transmitted in first bandwidth part 210, UE 115-a may use the same reference signals for performing receiver processing for transmissions on first bandwidth part 210 during the transition window 330 as the reference signals used to perform receiver processing for transmissions on second bandwidth part 215 (e.g., as indicated by a TCI field in DCI received on second bandwidth part 215), and, after the transition window, UE 115-a may use different reference signals for performing receiver processing for transmissions on first bandwidth part 210 (e.g., as indicated by a TCI field in DCI received on first bandwidth part 210).

As discussed above, the TCI field included in DCI may indicate a TCI state corresponding to reference signals that may be quasi co-located with data transmitted to UE 115-*a*, and the TCI state may indicate which QCL parameters (spatial properties, delay spread, Doppler effect, etc.) may be derived from the reference signals received from base station 105-*a*. In some cases, however, after a period of time, the originally configured TCI states may no longer correspond to suitable QCL relationships between antenna ports used for transmitting downlink signals to UE 115-*a*. In such cases, base station 105-*a* may update the TCI states used to indicate QCL relationships between antenna ports to UE 115-*a* (e.g., using a MAC control element (MAC-CE)). Thus, after receiving an indication of updated TCI states, UE 115-*a* may interpret TCI fields received in DCI differently. In some aspects, UE 115-*a* may receive an indication of updated TCI states (e.g., a TCI state reconfiguration), and the updated TCI states may be configured for a certain time period.

In such aspects, if the updated TCI states are configured in the second bandwidth part 215 and the time period during which the updated TCI states are valid does not extend beyond the transition window 330 (i.e., the application time), the updated TCI states may not affect the reference signals used to perform receiver processing in first bandwidth part 210 (i.e., since UE 115-*a* may use the reference signals received on second bandwidth part 215 for performing receiver processing during transition window 330). However, if the updated TCI states are configured in the second bandwidth part 215 and the time period during which the updated TCI states are valid extends beyond the transition window 330, UE 115-*a* may determine whether to use the updated TCI states to identify reference signals for performing receiver processing after transition window 330. In one example, the indication of the updated TCI states may be used for indicating updated QCL relationships in the second bandwidth part 215 and not in the first bandwidth part 210. In another example, the updated TCI states may be used for indicating updated QCL relationships in the second bandwidth part 215 and the first bandwidth part 210. In yet another example, the indication of the updated TCI states may be ignored since the time period during which the updated TCI states are valid extends beyond the transition window 330.

Figure 4:
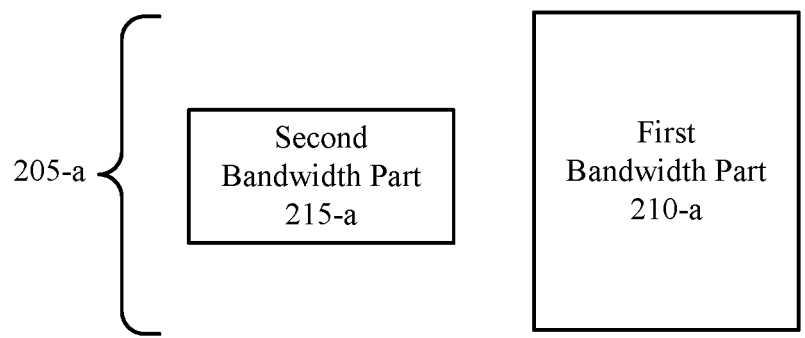
FIG. 4 illustrates an example of different bandwidth parts included in a carrier in accordance with aspects of the present disclosure.
Figure 4:
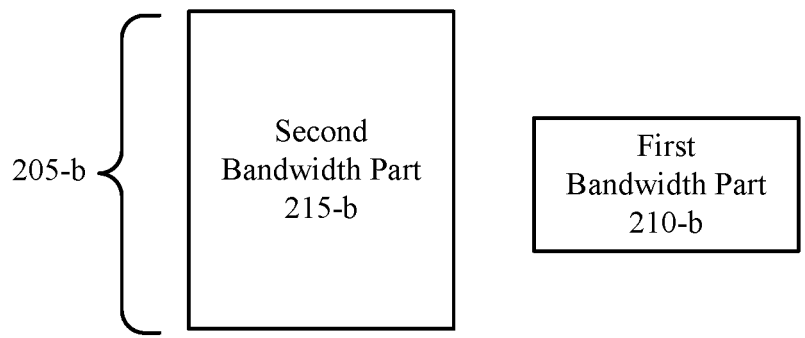
Figure 4:
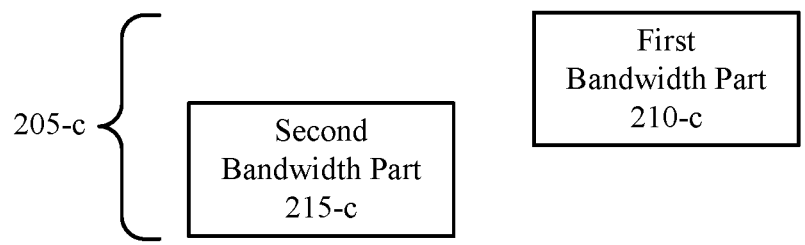

Although the techniques described above are related to performing receiver processing for demodulating a downlink transmission on a first bandwidth part 210 after transitioning from a second, non-overlapping bandwidth part 215, it is to be understood that the same techniques may be used for performing receiver processing for demodulating a downlink transmission on a first bandwidth part 210 using reference signals received on a second, overlapping bandwidth part 215. FIG. 4 illustrates examples of different bandwidth parts 400 (i.e., spanning different frequency bands) that may be included in a carrier 205. In one example, a carrier 205-*a* may include a second bandwidth part 215-*a* and a first bandwidth part 210-*a* that overlaps with and spans a larger frequency band than second bandwidth part 215-*b*. In another example, a carrier 205-*b* may include a second bandwidth part 215-*b* and a first bandwidth part 210-*b* that overlaps with and spans a smaller frequency band than second bandwidth part 215-*b*. In yet another example, a carrier 205-*a* may include a second bandwidth part 215-*c* and a first bandwidth part 210-*c* that partially overlaps with second bandwidth part 215-*c*. In each of these examples, UE 115-*a* may perform receiver processing for demodulating a downlink transmission on a first bandwidth part 210 using reference signals received on second a bandwidth part 215 after transitioning from communicating on the second bandwidth part 215 to communicating on the first bandwidth part 210.

Figure 5:
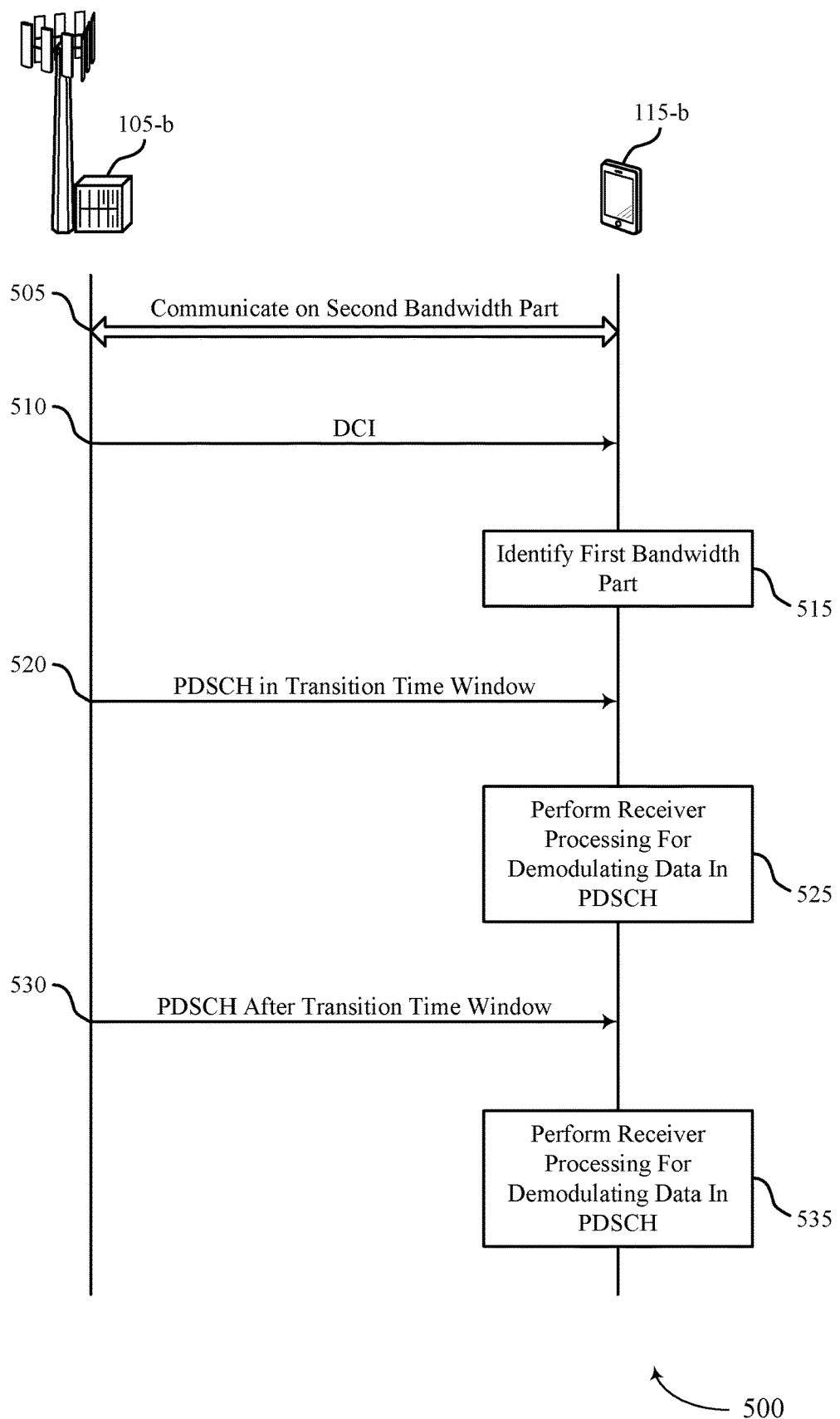
FIG. 5 illustrates an example of a process flow that supports QCL assumption during bandwidth part switching in accordance with aspects of the present disclosure.

FIG. 5 illustrates an example of a process flow 500 that supports QCL assumption during bandwidth part switching in accordance with various aspects of the present disclosure. Process flow 500 illustrates aspects of techniques performed by a base station 105-*b*, which may be an example of a base station 105 described with reference to FIGS. 1-4. Process flow 500 also illustrates aspects of techniques performed by a UE 115-*b*, which may be an example of a UE 115 described with reference to FIGS. 1-4. Although the techniques described below are directed to a single transition from one bandwidth part to another bandwidth part, it is to be understood that these techniques may be applied each time UE 115-*b* transitions from communicating on one bandwidth part to communicating on another bandwidth part.

At 505, base station 105-*b* may communicate with UE 115-*b* on a second bandwidth part. After communicating with base station 105-*b* on the second bandwidth part for a period of time, UE 115-*b* may be configured to transition to a first bandwidth part for communicating with base station 105-*b*. For instance, at 510, UE 115-*b* may receive a DCI message that schedules communications with base station 105-*b* on the first bandwidth part. Alternatively, UE 115-*b* may be configured to transition to communicating on the first bandwidth part after a timer expires. In any case, at 515, UE 115-*b* may identify the first bandwidth part for communications with base station 105-*b*.

At 520, base station 105-*b* may generate a downlink transmission of data, and UE 115-*b* may then receive data (and accompanying demodulation reference signals (DMRS)) in a transition time window on the first bandwidth part. Though UE 115-*b* may identify a TCI state for performing receiver processing for demodulating data received on the first bandwidth part (i.e., corresponding to reference signals and a set of QCL parameters of a plurality of sets of QCL parameters), UE 115-*b* may be scheduled to receive the data before receiving any reference signals on the first bandwidth part.

Accordingly, using the techniques described herein, at 525, UE 115-*b* may perform receiver processing for demodulating the data (and accompanying DMRS) received on the first bandwidth part using reference signals received on second bandwidth part. That is, UE 115-*b* may identify a QCL assumption that indicates that the QCL parameters (e.g., a Doppler parameter, an average delay parameter, a Doppler shift parameter, and/or a spatial receive parameter) of the transmission in the PDSCH in the transition time window on the first bandwidth part may be derived from reference signals received on the second bandwidth part (i.e., since the QCL assumption may indicate that antenna ports used to transmit the data in the transition time window are quasi co-located with antenna ports used to transmit reference signals in the second bandwidth part).

In some cases, UE 115-*b* may receive an indicator (e.g., the TCI field in the DCI) that indicates that UE 115-*b* should derive the QCL parameters for performing receiver processing for demodulating data received on the first bandwidth part using reference signals received on the second bandwidth part. UE 115-*b* may use these techniques for performing receiver processing using reference signals received on second bandwidth part for any transmission received on the first bandwidth part during the transition time window. In some cases, UE 115-*b* may receive RRC signaling, DCI, or a control element (i.e., from base station 105-*b*) that indicates a duration of the transition time window. Alternatively, UE 115-*b* may locally store the duration of the transition time window (e.g., for each bandwidth part).

Further, the duration of the transition time window may be a function of a periodicity of reference signal transmissions on the first bandwidth part. Additionally, or alternatively, the transition time window may span a time period on the first bandwidth part up to the first reference signal received on the first bandwidth part (e.g., a TRS). For instance, if a reference signal is scheduled to be transmitted every 20 ms, the transition window may span the first 19 ms after UE 115-*b* transitions to communicating on the first bandwidth part. Additionally, or alternatively, the transition time window may span a defined number of reference signal transmissions on the first bandwidth part (e.g., 1, 2, 3, etc. reference signal transmissions). For instance, if a reference signal is scheduled to be transmitted every 20 ms, the transition window may span 22 ms (e.g., spanning one reference signal transmission and providing 2 ms for UE 115-*b* to process the reference signal) or 82 ms (e.g., spanning four reference signal transmissions and providing 2 ms for UE 115-*b* to process the fourth reference signal and subsequently receive control and/or data signals (e.g., PDSCH and/or PDCCH) based on QCL parameters derived from the reference signals of the first bandwidth part). Regardless of the length of the transition time window, once UE 115-*b* receives and processes at least one reference signal on first bandwidth part, UE 115-*b* may be configured to use this reference signal to perform receiver processing.

In some cases, UE 115-*b* may also receive an indication (e.g., from base station 105-*b* in RRC signaling, DCI, or a control element such as a MAC-CE) of whether reference signals received on the first bandwidth part are quasi co-located with reference signals received (or to be received) on the second bandwidth part. If UE 115-*b* determines that reference signals received on the first bandwidth part are quasi co-located with reference signals received on the second bandwidth part (e.g., based on the indication), UE 115-*b* may apply the same filter to reference signals received on the first bandwidth part and reference signals received on the second bandwidth together (i.e., non-coherently or coherently filter the reference signals received on the first bandwidth part and the reference signals received on the second bandwidth). In some examples, some QCL parameters, such as delay spread, the reference signals may be filtered non-coherently. Alternatively, if UE 115-*b* determines that reference signals received on the first bandwidth part are not quasi co-located with reference signals received on the second bandwidth part (e.g., based on the indication), UE 115-*b* may determine not to apply the same filter to reference signals received on the first bandwidth part and reference signals received on the second bandwidth part (i.e., UE 115-*b* may restart the filtering process for reference signals received on the first bandwidth part).

In some cases, after the transition time window expires, base station 105-*b* may generate another downlink transmission of data, and, at 530, base station 105-*b* may transmit the data in a PDSCH after the transition time window expires. Since the downlink transmission may not be during the transition time window, UE 115-*b* may have received sufficient reference signals on first bandwidth part to perform receiver processing for demodulating the data on the first bandwidth part using the reference signals received on the first bandwidth part. As such, at 535, UE 115-*b* may perform receiver processing for demodulating the data received on first bandwidth part using the reference signals received on the first bandwidth part. The reference signals used for performing the receiver processing and the QCL parameters derived from these reference signals may be determined based on the TCI state indicated in the DCI used to schedule the downlink transmission (if any) or indicated via higher layer signaling.

Although the techniques described above are directed to a UE 115-*b* transitioning from a second bandwidth part to a first bandwidth part to receive a downlink transmission from base station 105-*b*, it is to be understood that the UE 115-*b* may transition from the second bandwidth part to the first bandwidth part to transmit an uplink transmission (e.g., using an uplink beam) to base station 105-*b* (e.g., in a physical uplink control channel (PUCCH) or a physical uplink shared channel (PUSCH)). In this case, base station 105-*b* may perform receiver processing for demodulating the uplink transmission on the first bandwidth part during the transition time window based on reference signals received from UE 115-*b* on the second bandwidth part (e.g., uplink sounding reference signals (SRSs)) or reference signals transmitted to UE 115-*b* on the second bandwidth part (e.g., downlink reference signals).

Figure 6:
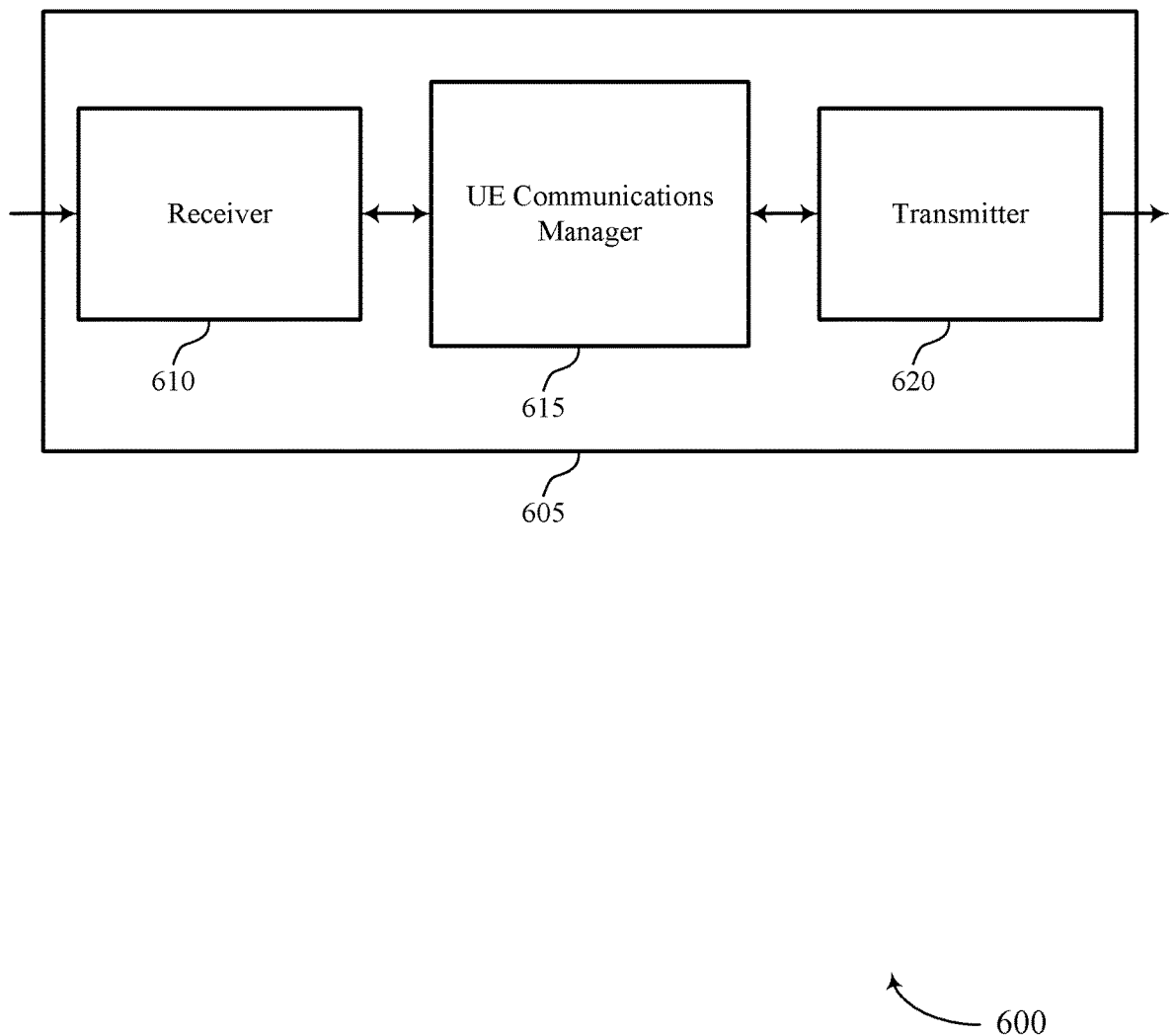
FIGS. 6-8 show block diagrams of a device that supports QCL assumption during bandwidth part switching in accordance with aspects of the present disclosure.

FIG. 6 shows a block diagram 600 of a wireless device 605 that supports QCL assumption during bandwidth part switching in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to QCL assumption during bandwidth part switching, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive an indicator indicating to derive a QCL assumption for a DMRS for a first bandwidth part from a reference signal of a second bandwidth part, receive a grant in the second bandwidth part instructing the UE to switch from the second bandwidth part to the first bandwidth part, and demodulate, based on the QCL assumption, a transmission in the first bandwidth part received within a transition time window occurring after the UE receives the grant.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
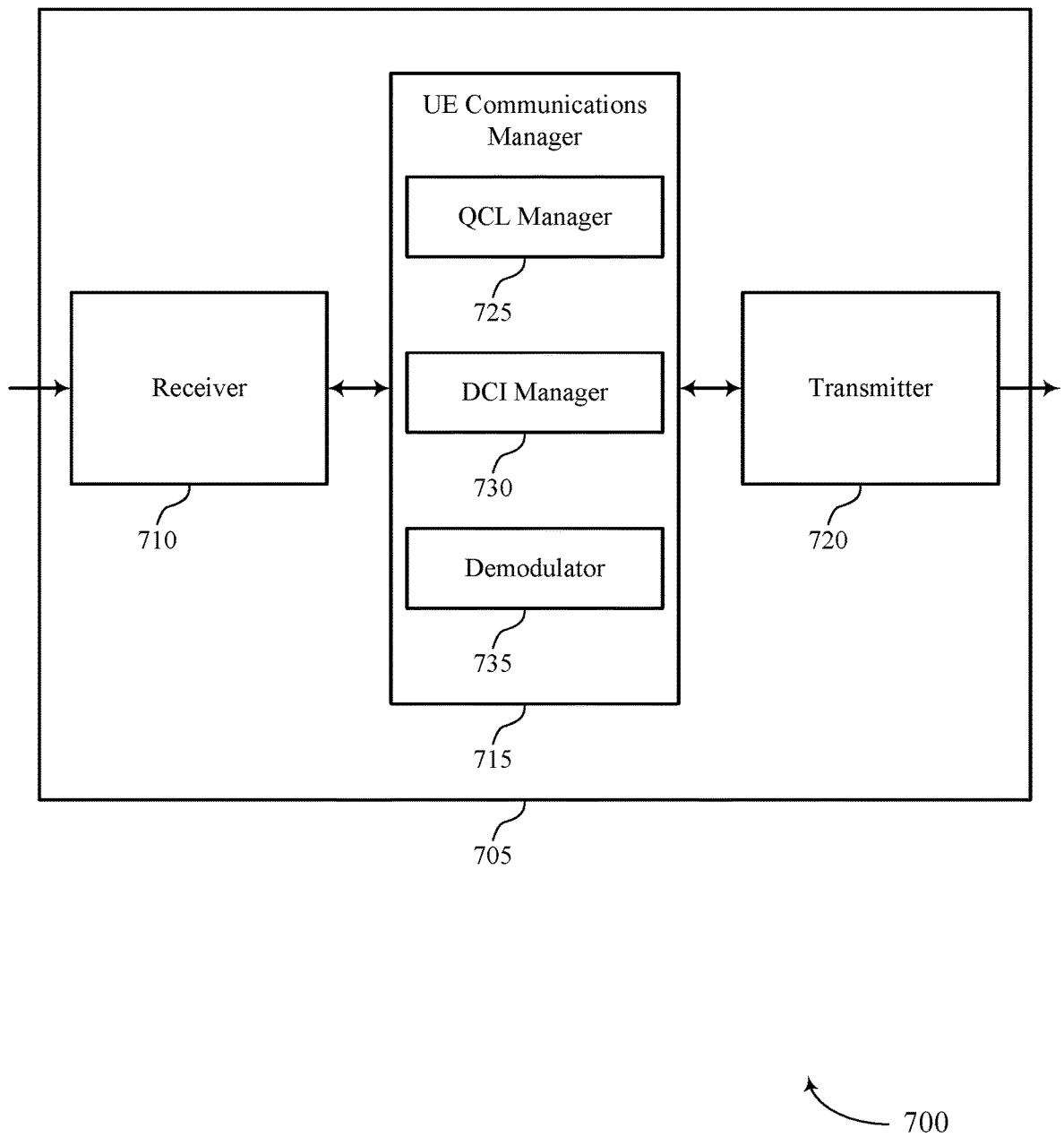

FIG. 7 shows a block diagram 700 of a wireless device 705 that supports QCL assumption during bandwidth part switching in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. UE communications manager 715 may be an example of aspects of the UE communications manager 915 described with reference to FIG. 9. UE communications manager 715 may also include QCL manager 725, DCI manager 730, and demodulator 735. Wireless device 705 may also include a processor. Each of these components may be in communication with one another (e.g., via one or more buses).

Receiver 710 may receive information such as packets, user data, or control information associated with various information channels (e.g., control channels, data channels, and information related to QCL assumption during bandwidth part switching, etc.). Information may be passed on to other components of the device. The receiver 710 may be an example of aspects of the transceiver 935 described with reference to FIG. 9. The receiver 710 may utilize a single antenna or a set of antennas.

QCL manager 725 may receive an indicator indicating to derive a QCL assumption for a DMRS for a first bandwidth part from a reference signal of a second bandwidth part. DCI manager 730 may receive a grant in the second bandwidth part instructing the UE to switch from the second bandwidth part to the first bandwidth part. Demodulator 735 may demodulate, based on the QCL assumption, a transmission in the first bandwidth part received within a transition time window occurring after the UE receives the grant.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
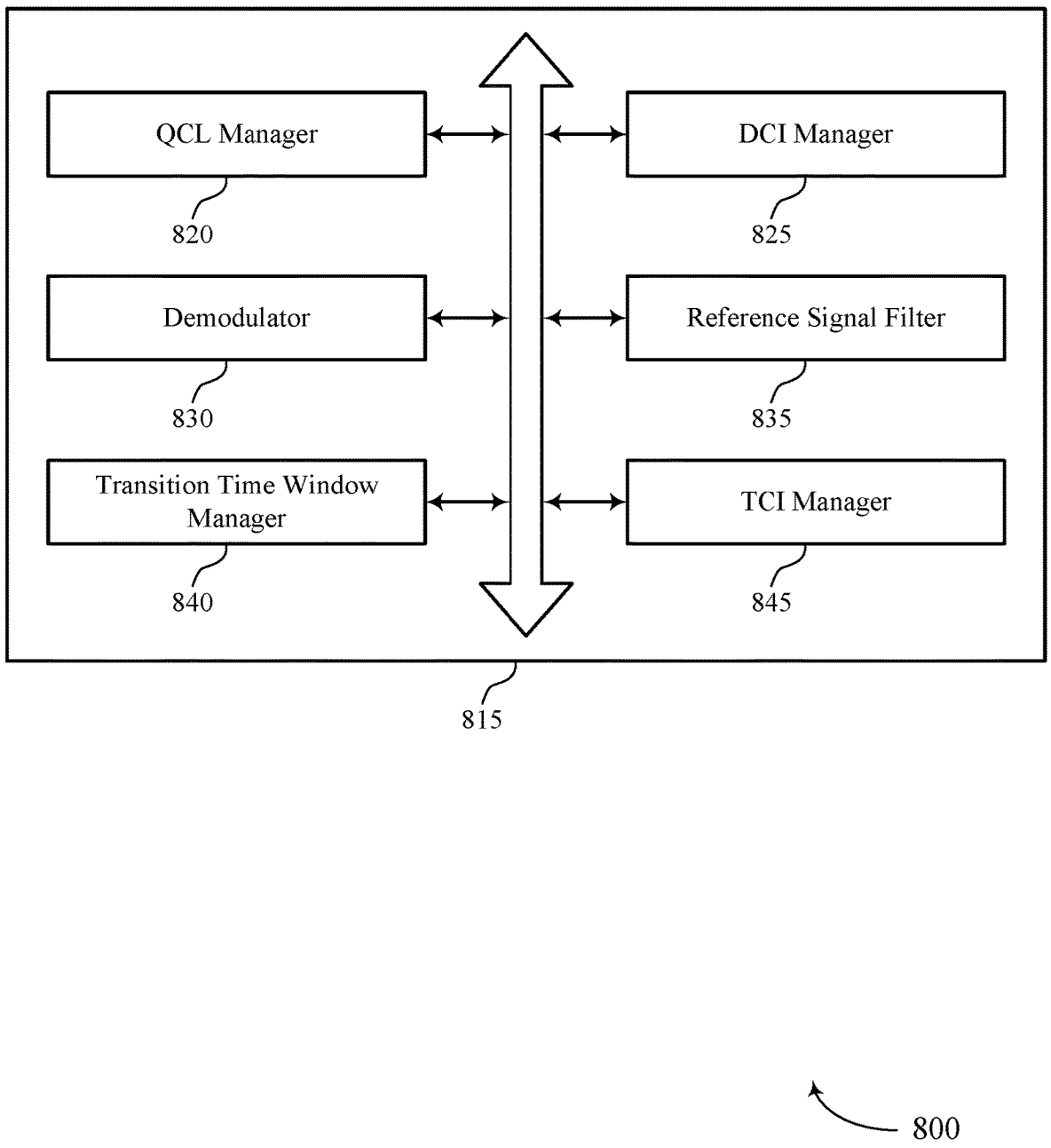

FIG. 8 shows a block diagram 800 of a UE communications manager 815 that supports QCL assumption during bandwidth part switching in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include QCL manager 820, DCI manager 825, demodulator 830, reference signal filter 835, transition time window manager 840, and TCI manager 845. Each of these modules may communicate, directly or indirectly, with one another (e.g., via one or more buses).

QCL manager 820 may receive an indicator indicating to derive a QCL assumption for a DMRS for a first bandwidth part from a reference signal of a second bandwidth part. DCI manager 825 may receive a grant in the second bandwidth part instructing the UE to switch from the second bandwidth part to the first bandwidth part. Demodulator 830 may demodulate, based on the QCL assumption, a transmission in the first bandwidth part received within a transition time window occurring after the UE receives the grant. In some cases, a receiver in communications with UE communications manager 815 may monitor a shared data channel or a control channel of the first bandwidth part for the transmission.

In some cases, the indicator indicates that the reference signal of the second bandwidth part is cross bandwidth part quasi co-located with a second reference signal of the first bandwidth part. In such cases, reference signal filter 835 may filter the reference signal and the second reference signal across the first and second bandwidth parts to determine a QCL parameter, where the transmission in the first bandwidth part is demodulated based on the QCL parameter. In other cases, the indicator indicates that the reference signal of the second bandwidth part is not cross bandwidth part quasi co-located with a second reference signal of the first bandwidth part. In such cases, reference signal filter 835 may determine not to filter the reference signal and the second reference signal across the first and second bandwidth parts.

In some cases, transition time window manager 840 may determine that the transition time window has expired. In such cases, QCL manager 820 may derive a second QCL assumption for the DMRS for the first bandwidth part from a reference signal of the first bandwidth part, and demodulator 830 may demodulate, after the transition time window has expired, a second transmission in the first bandwidth part based on the second QCL assumption. In some cases, the QCL assumption indicates to derive a QCL parameter for the first bandwidth part based on the reference signal of the second bandwidth part, and the transmission in the first bandwidth part is demodulated based on the QCL parameter. In some cases, the QCL parameter is a delay spread parameter, a Doppler parameter, an average delay parameter, a Doppler shift parameter, a spatial receive parameter, or any combination thereof. In some cases, demodulator 830 may receive RRC signaling, or DCI, or a control element that indicates a duration of the transition time window.

In some cases, QCL manager 820 receive RRC signaling, or DCI, or a control element that indicates whether the reference signal of the second bandwidth part is cross bandwidth part quasi co-located with a second reference signal of the first bandwidth part. In some cases, the UE communications manager 815 locally stores a duration of the transition time window. In some cases, a duration of the transition time window is a function of a periodicity of a second reference signal of the first bandwidth part. In some cases, the reference signal is a CSI-RS, a SSB, or a TRS. In some cases, the indicator is a TCI that indicates a QCL parameter set from a set of different QCL parameter sets.

TCI manager 845 may derive a TCI state for the first bandwidth part based on a configured TCI state for the second bandwidth part. In some cases, TCI manager 845 may receive configuration information configuring the UE to utilize a first TCI state for the first bandwidth part of a set of different TCI states, and where each TCI state of the set of TCI states identifies at least one reference signal and includes a parameter for a receive beam configured for receiving a direction transmission in the second bandwidth part, and TCI manager 845 may coordinate with a receiver to receive the transmission in the first bandwidth part in accordance with the first TCI state.

In some cases, TCI manager 845 may receive, prior to the grant, a control element configuring the UE to utilize a TCI interpretation in the second bandwidth part, determine that an application time of the control element occurs within the transition time window, and coordinate with a receiver to receive the transmission in the first bandwidth part in accordance with the TCI interpretation. In some cases, TCI manager 845 may receive, prior to the grant, a control element configuring the UE to utilize a TCI interpretation in the second bandwidth part, and TCI manager 845 may determine whether to apply or reject the TCI interpretation for transmissions received in the first bandwidth part during the transition time window based on an application time of the control element extending after the transition time window.

In some cases, the transmission is a coreset, and demodulator 830 may demodulate the coreset in the first bandwidth part based on the QCL assumption. In some cases, the transmission is a first coreset, and demodulator 830 may map the first coreset and a second coreset in the first bandwidth part and demodulate the first coreset and the second coreset based on the QCL assumption and the mapping.

Figure 9:
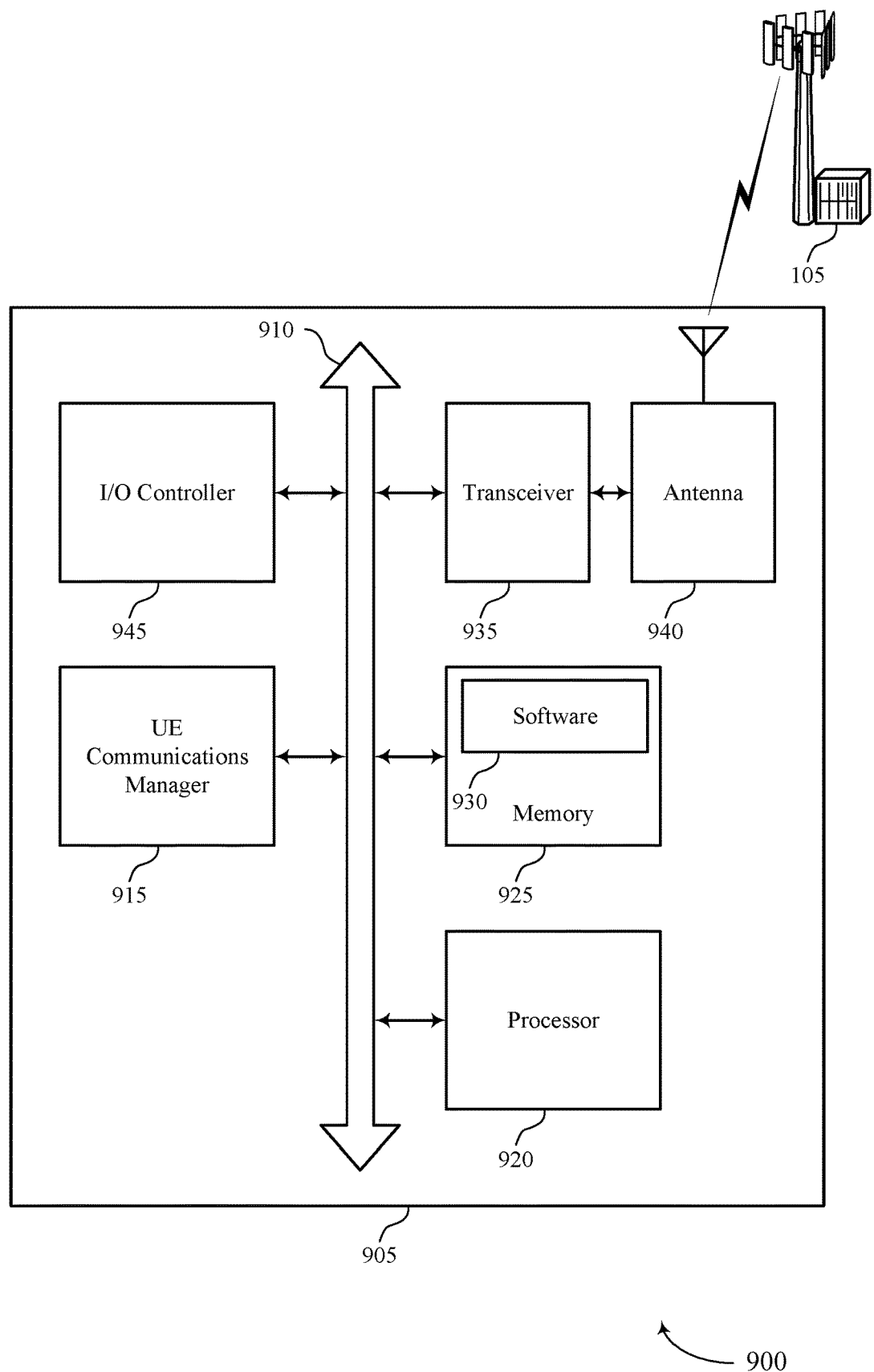
FIG. 9 illustrates a block diagram of a system including a UE that supports QCL assumption during bandwidth part switching in accordance with aspects of the present disclosure.

FIG. 9 shows a diagram of a system 900 including a device 905 that supports QCL assumption during bandwidth part switching in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting QCL assumption during bandwidth part switching).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support QCL assumption during bandwidth part switching. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
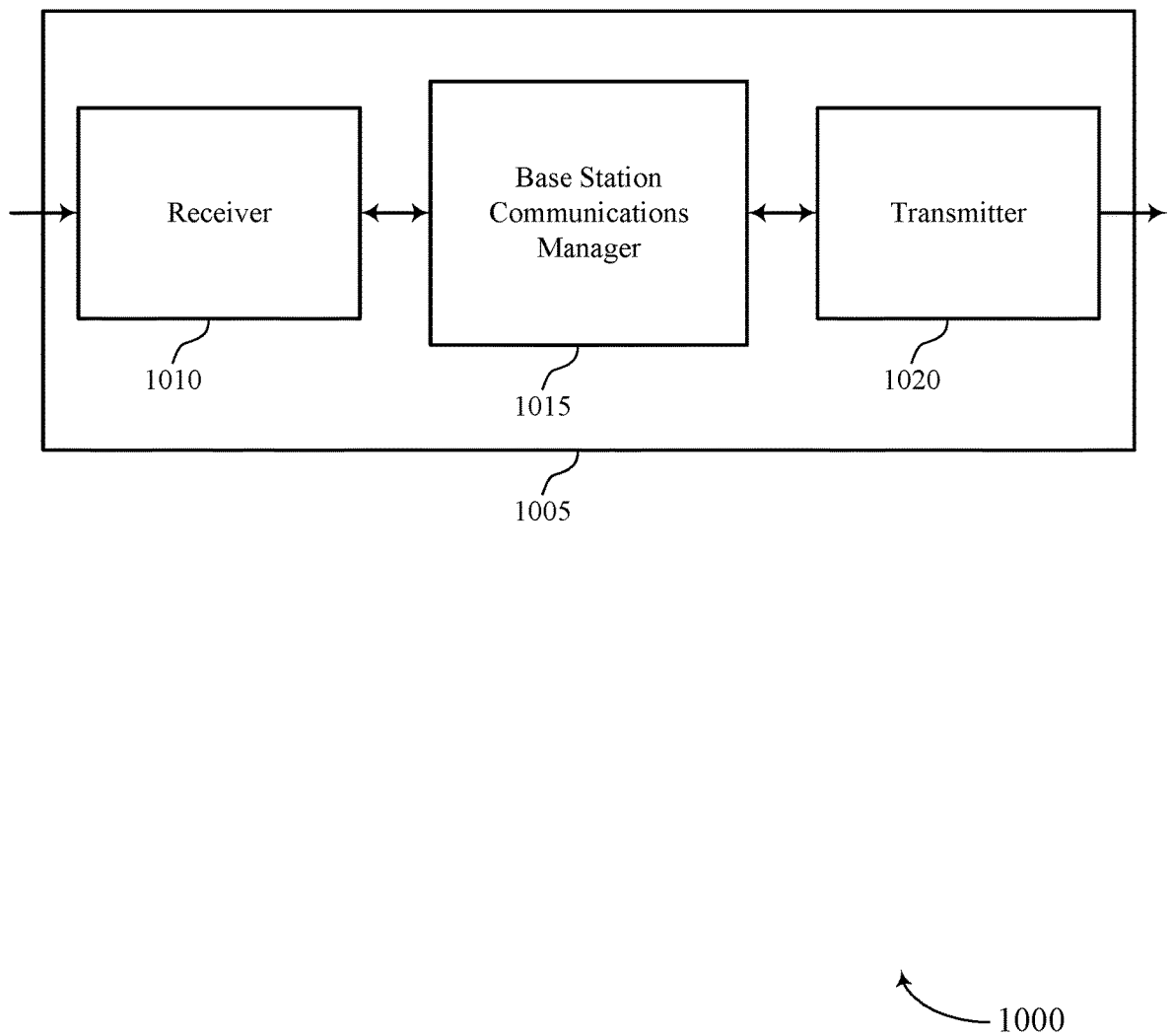
FIGS. 10-12 show block diagrams of a device that supports QCL assumption during bandwidth part switching in accordance with aspects of the present disclosure.

FIG. 10 shows a block diagram 1000 of a wireless device 1005 that supports QCL assumption during bandwidth part switching in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to QCL assumption during bandwidth part switching, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may transmit, to a UE, an indicator indicating to derive a QCL assumption for a DMRS for a first bandwidth part from a reference signal of a second bandwidth part, transmit a grant in the second bandwidth part instructing the UE to switch from the second bandwidth part to the first bandwidth part, generate a transmission in accordance with the QCL assumption, and coordinate with transmitter 1020 to transmit the transmission in the first bandwidth part during a transition time window occurring after the UE is instructed to switch from the second bandwidth part to the first bandwidth part.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
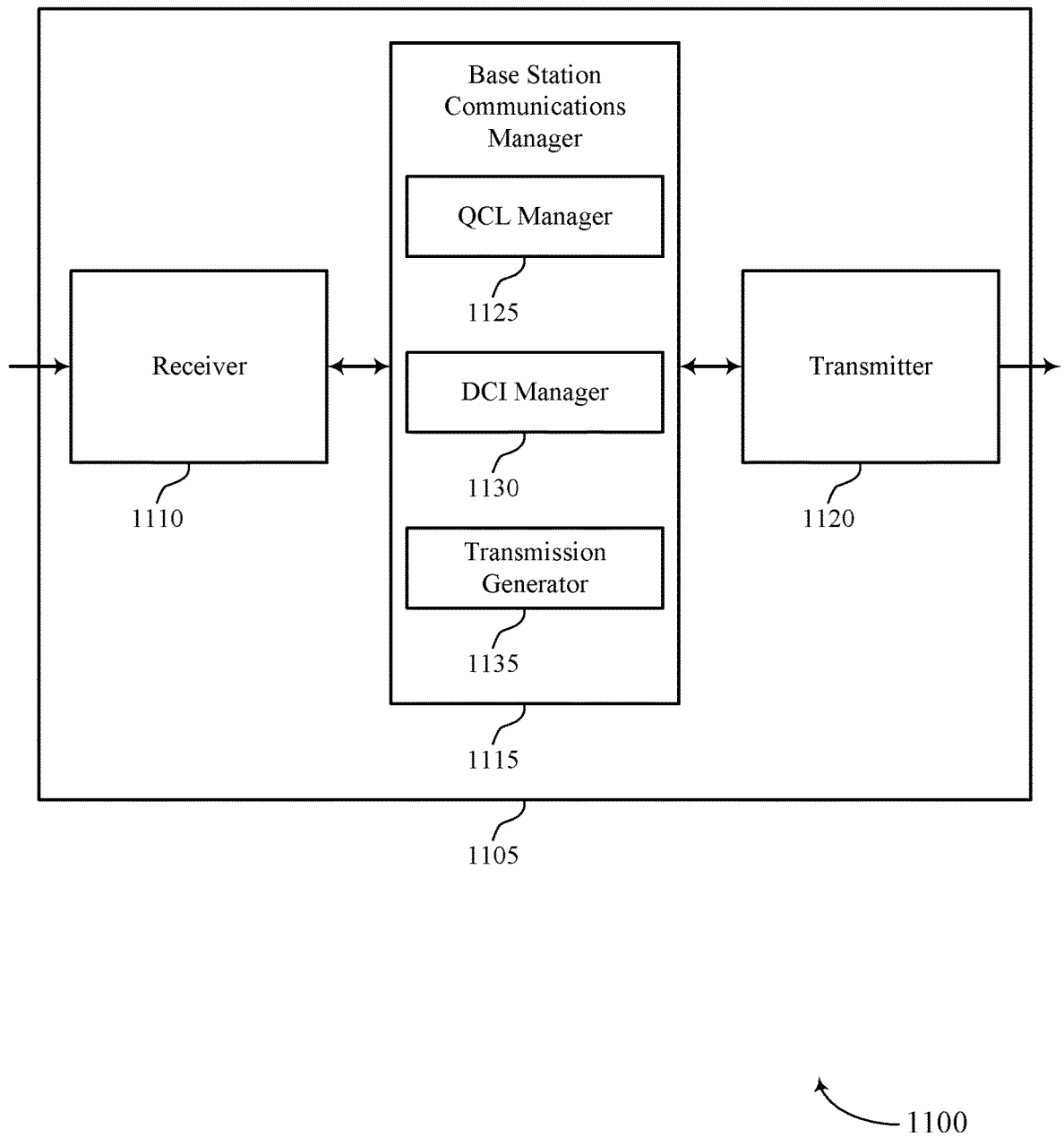

FIG. 11 shows a block diagram 1100 of a wireless device 1105 that supports QCL assumption during bandwidth part switching in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Base station communications manager 1115 may be an example of aspects of the base station communications manager 1315 described with reference to FIG. 13. Base station communications manager 1115 may also include QCL manager 1125, DCI manager 1130, and transmission generator 1135. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to QCL assumption during bandwidth part switching, etc.). Information may be passed on to other components of the device. The receiver 1110 may be an example of aspects of the transceiver 1335 described with reference to FIG. 13. The receiver 1110 may utilize a single antenna or a set of antennas.

QCL manager 1125 may transmit, to a UE, an indicator indicating to derive a QCL assumption for a DMRS for a first bandwidth part from a reference signal of a second bandwidth part. DCI manager 1130 may transmit a grant in the second bandwidth part instructing the UE to switch from the second bandwidth part to the first bandwidth part. Transmission generator 1135 may generate a transmission in accordance with the QCL assumption. Base station communications manager 1115 may then coordinate with transmitter 1120 to transmit the transmission in the first bandwidth part during a transition time window occurring after the UE is instructed to switch from the second bandwidth part to the first bandwidth part.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
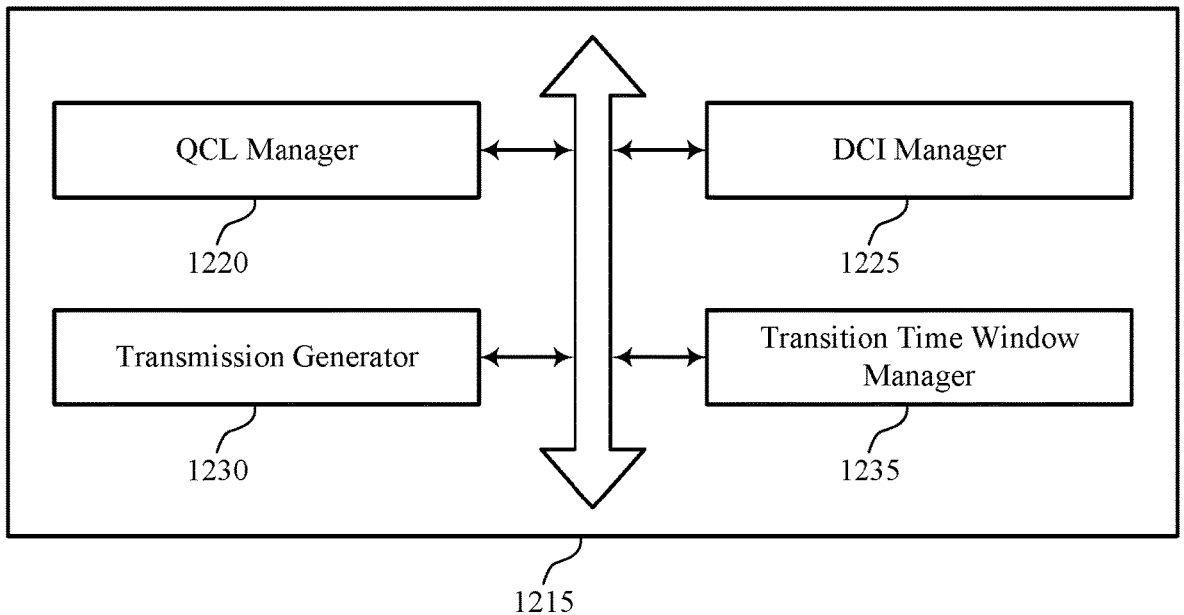

FIG. 12 shows a block diagram 1200 of a base station communications manager 1215 that supports QCL assumption during bandwidth part switching in accordance with aspects of the present disclosure. The base station communications manager 1215 may be an example of aspects of a base station communications manager 1315 described with reference to FIGS. 10, 11, and 13. The base station communications manager 1215 may include QCL manager 1220, DCI manager 1225, transmission generator 1230, and transition time window manager 1235. Each of these modules may communicate, directly or indirectly, with one another (e.g., via one or more buses).

QCL manager 1220 may transmit, to a UE, an indicator indicating to derive a QCL assumption for a DMRS for a first bandwidth part from a reference signal of a second bandwidth part. DCI manager 1225 may transmit a grant in the second bandwidth part instructing the UE to switch from the second bandwidth part to the first bandwidth part. Transmission generator 1230 may generate a transmission in accordance with the QCL assumption. Base station communications manager 1215 may then coordinate with a transmitter to transmit the transmission in the first bandwidth part during a transition time window occurring after the UE is instructed to switch from the second bandwidth part to the first bandwidth part.

In some cases, transition time window manager 1235 may determine that the transition time window has expired. In such cases, transmission generator 1230 may generate a second transmission in accordance a second QCL assumption corresponding to the first bandwidth part. Base station communications manager 1215 may then coordinate with a transmitter to transmit, after the transition time window has expired, the second transmission in the first bandwidth part.

In some cases, base station communications manager 1215 may coordinate with a transmitter to transmit radio resource control signaling, or downlink control information, or a control element that indicates a duration of the transition time window. In some cases, QCL manager 1220 may coordinate with a transmitter to transmit radio resource control signaling, or downlink control information, or a control element that indicates whether the reference signal of the second bandwidth part is cross bandwidth part quasi co-located with a second reference signal of the first bandwidth part. In some cases, base station communications manager 1215 may coordinate with a transmitter to transmit the reference signal in the second bandwidth part and transmit a second reference signal in the first bandwidth part. In some cases, the reference signal is a CSI-RS, an SSB, or a TRS.

Figure 13:
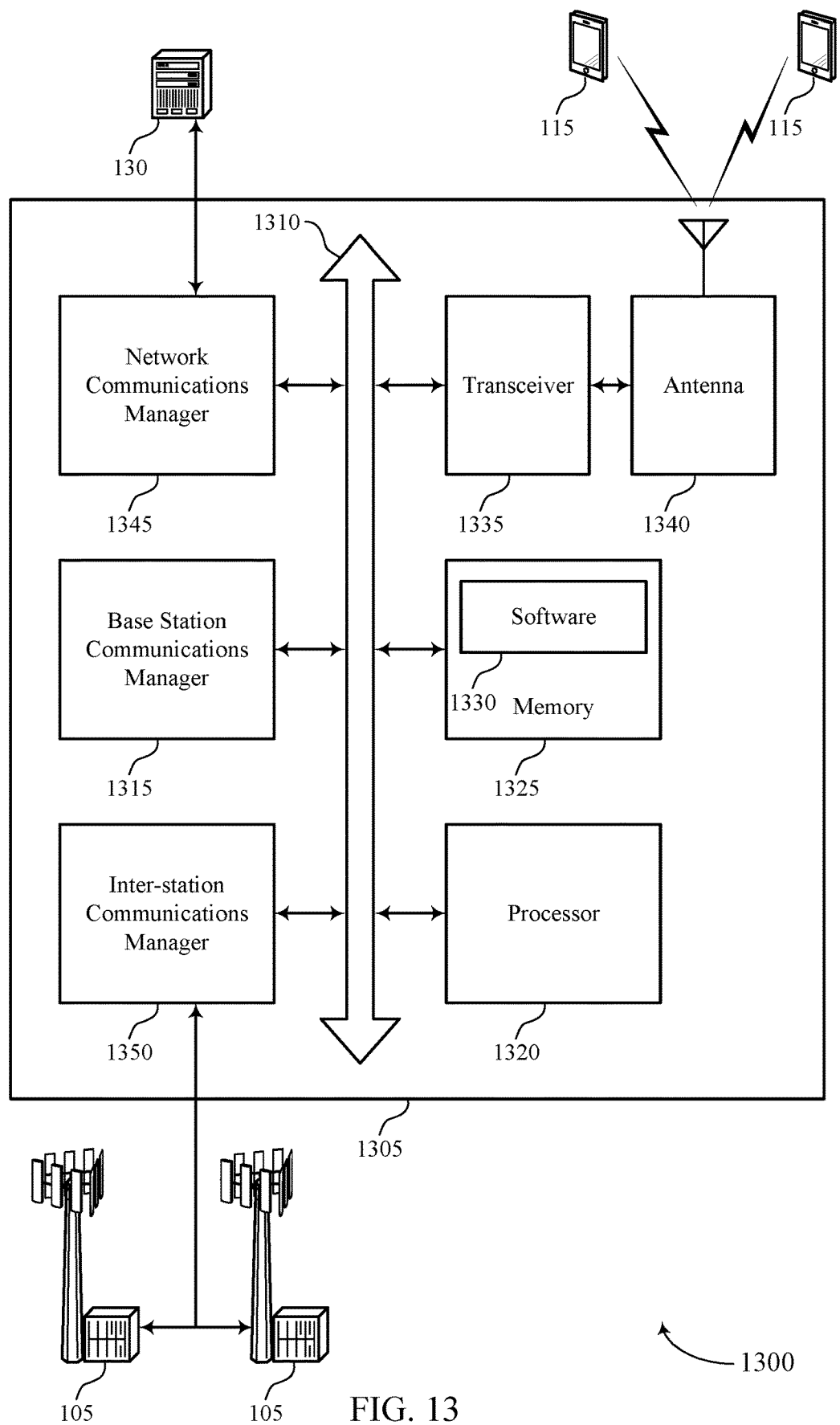
FIG. 13 illustrates a block diagram of a system including a base station that supports QCL assumption during bandwidth part switching in accordance with aspects of the present disclosure.

FIG. 13 shows a diagram of a system 1300 including a device 1305 that supports QCL assumption during bandwidth part switching in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting QCL assumption during bandwidth part switching).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support QCL assumption during bandwidth part switching. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105 and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
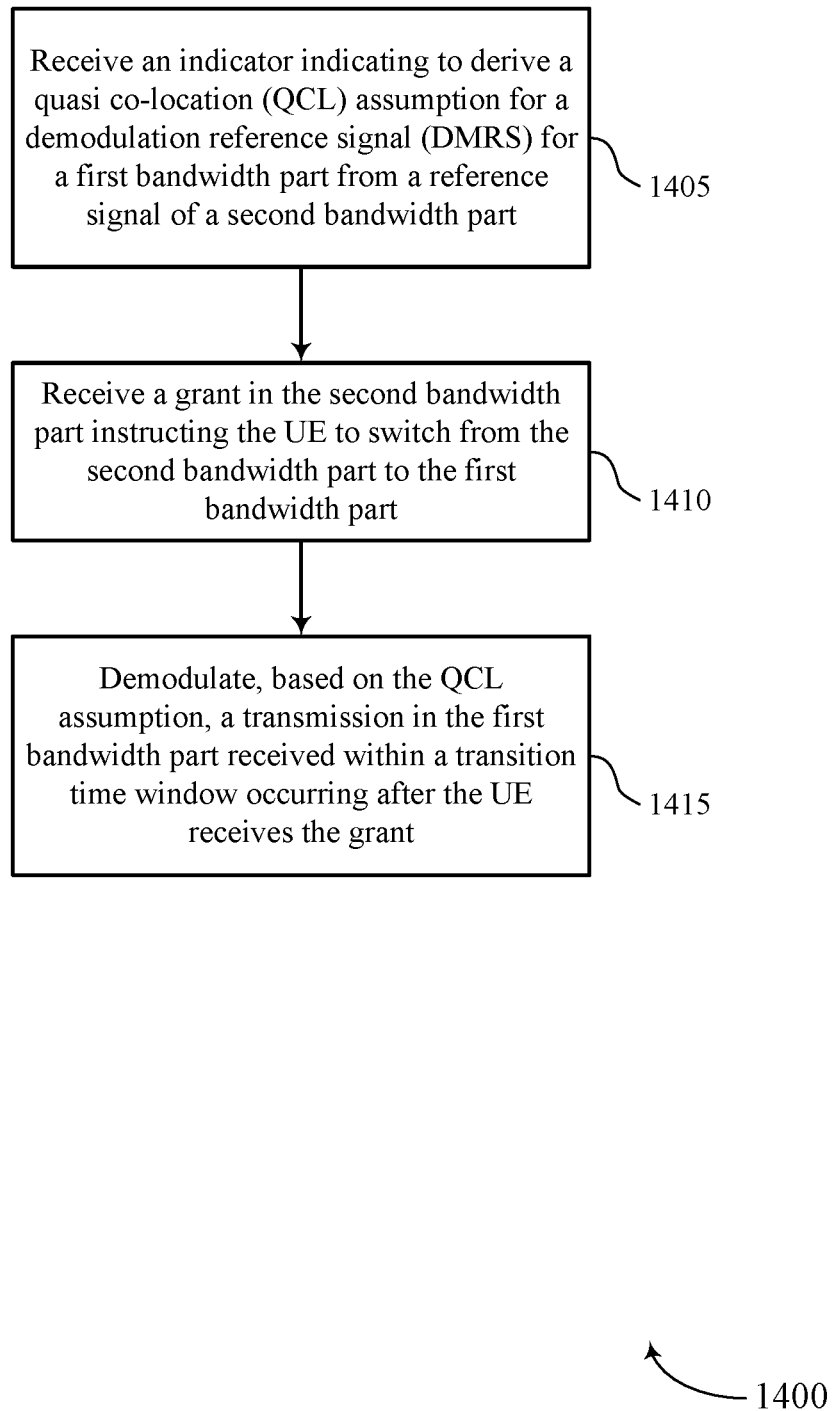
FIGS. 14 and 15 illustrate methods for QCL assumption during bandwidth part switching in accordance with aspects of the present disclosure.

FIG. 14 shows a flowchart illustrating a method 1400 for QCL assumption during bandwidth part switching in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally, or alternatively, the UE 115 may perform aspects of the functions described below using special-purpose hardware.

At 1405 the UE 115 may receive an indicator indicating to derive a QCL assumption for a DMRS for a first bandwidth part from a reference signal of a second bandwidth part. The operations of 1405 may be performed according to the methods described herein. In certain examples, aspects of the operations of 1405 may be performed by a QCL manager as described with reference to FIGS. 6 through 9.

At 1410 the UE 115 may receive a grant in the second bandwidth part instructing the UE to switch from the second bandwidth part to the first bandwidth part. The operations of 1410 may be performed according to the methods described herein. In certain examples, aspects of the operations of 1410 may be performed by a DCI manager as described with reference to FIGS. 6 through 9.

At 1415 the UE 115 may demodulate, based at least in part on the QCL assumption, a transmission in the first bandwidth part received within a transition time window occurring after the UE receives the grant. The operations of 1415 may be performed according to the methods described herein. In certain examples, aspects of the operations of 1415 may be performed by a demodulator as described with reference to FIGS. 6 through 9.

Figure 15:
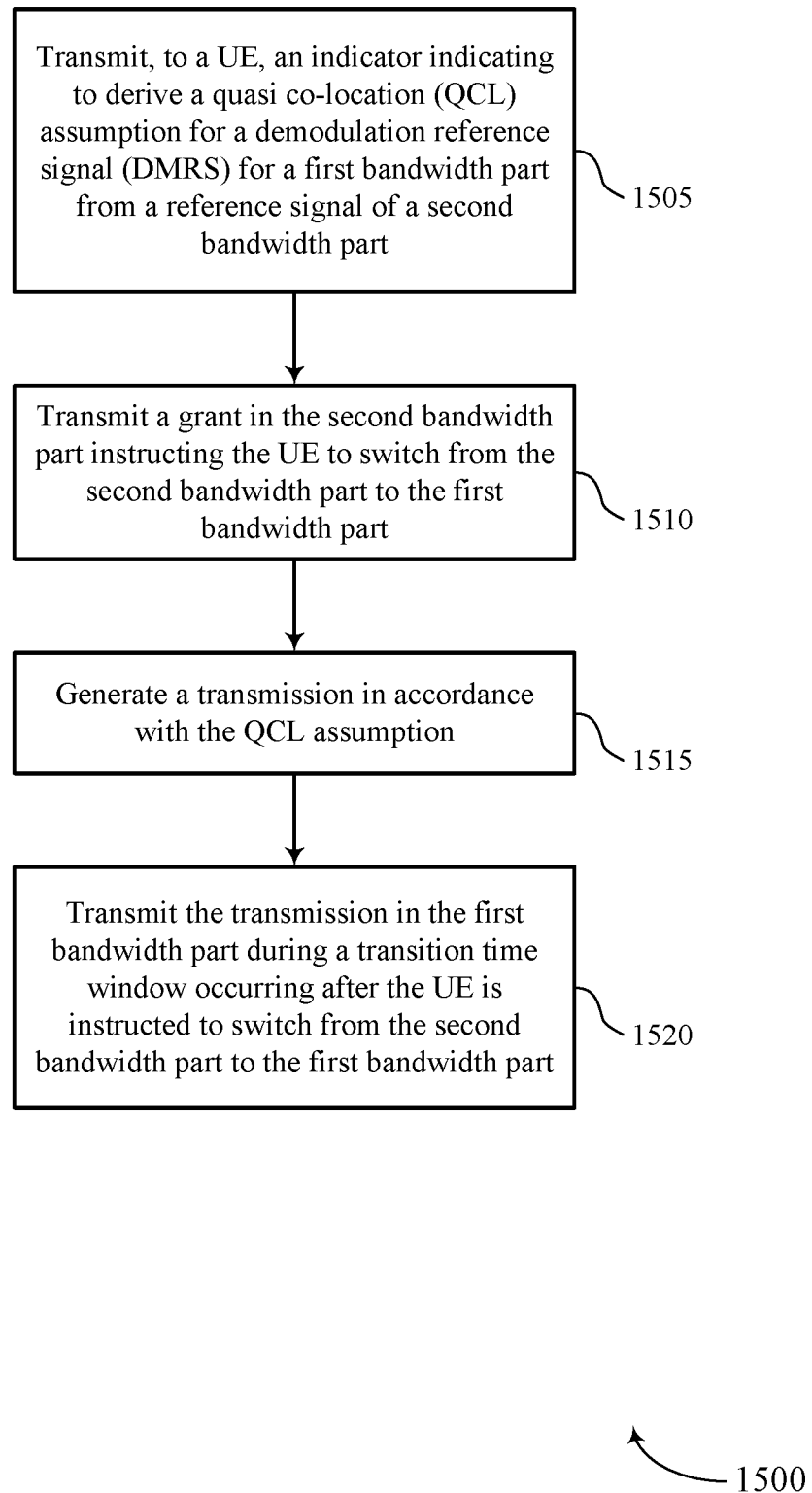

FIG. 15 shows a flowchart illustrating a method 1500 for QCL assumption during bandwidth part switching in accordance with aspects of the present disclosure. The operations of method 1500 may be implemented by a base station 105 or its components as described herein. For example, the operations of method 1500 may be performed by a base station communications manager as described with reference to FIGS. 10 through 13. In some examples, a base station 105 may execute a set of codes to control the functional elements of the device to perform the functions described below. Additionally, or alternatively, the base station 105 may perform aspects of the functions described below using special-purpose hardware.

At 1505 the base station 105 may transmit, to a UE, an indicator indicating to derive a QCL assumption for a DMRS for a first bandwidth part from a reference signal of a second bandwidth part. The operations of 1505 may be performed according to the methods described herein. In certain examples, aspects of the operations of 1505 may be performed by a QCL manager as described with reference to FIGS. 10 through 13.

At 1510 the base station 105 may transmit a grant in the second bandwidth part instructing the UE to switch from the second bandwidth part to the first bandwidth part. The operations of 1510 may be performed according to the methods described herein. In certain examples, aspects of the operations of 1510 may be performed by a DCI manager as described with reference to FIGS. 10 through 13.

At 1515 the base station 105 may generate a transmission in accordance with the QCL assumption. The operations of 1515 may be performed according to the methods described herein. In certain examples, aspects of the operations of 1515 may be performed by a transmission generator as described with reference to FIGS. 10 through 13.

At 1520 the base station 105 may transmit the transmission in the first bandwidth part during a transition time window occurring after the UE is instructed to switch from the second bandwidth part to the first bandwidth part. The operations of 1520 may be performed according to the methods described herein. In certain examples, aspects of the operations of 1520 may be performed by a transmitter as described with reference to FIGS. 10 through 13.

Embodiment 1

A method for wireless communication by a UE, comprising: receiving an indicator indicating to derive a QCL assumption for a DMRS for a first bandwidth part from a reference signal of a second bandwidth part; receiving a grant in the second bandwidth part instructing the UE to switch from the second bandwidth part to the first bandwidth part; and demodulating, based at least in part on the QCL assumption, a transmission in the first bandwidth part received within a transition time window occurring after the UE receives the grant.

Embodiment 2

The method of embodiment 1 wherein a duration of the transition time window corresponds to a duration of a first data channel on the first bandwidth part, the first data channel comprising the transmission in the first bandwidth part.

Embodiment 3

The method of embodiments 1 or 2, wherein the indicator indicates that the reference signal of the second bandwidth part is cross bandwidth part quasi co-located with a second reference signal of the first bandwidth part, the method further comprising: filtering the reference signal and the second reference signal across the first and second bandwidth parts to determine a QCL parameter, wherein the transmission in the first bandwidth part is demodulated based at least in part on the QCL parameter Embodiment 4

The method of embodiments 1 to 3, wherein the indicator indicates that the reference signal of the second bandwidth part is not cross bandwidth part quasi co-located with a second reference signal of the first bandwidth part, the method further comprising: determining not to filter the reference signal and the second reference signal across the first and second bandwidth parts.

Embodiment 5

The method of embodiments 1 to 4, further comprising: determining that the transition time window has expired; deriving a second QCL assumption for the DMRS for the first bandwidth part from a reference signal of the first bandwidth part; and demodulating, after the transition time window has expired, a second transmission in the first bandwidth part based at least in part on the second QCL assumption.

Embodiment 6

The method of embodiments 1 to 5, wherein the QCL assumption indicates to derive a QCL parameter for the first bandwidth part based at least in part on the reference signal of the second bandwidth part, and wherein the transmission in the first bandwidth part is demodulated based at least in part on the QCL parameter.

Embodiment 7

The method of embodiments 1 to 6, wherein the QCL parameter is a delay spread parameter, a Doppler parameter, an average delay parameter, a Doppler shift parameter, a spatial receive parameter, or any combination thereof.

Embodiment 8

The method of embodiments 1 to 7, further comprising: receiving radio resource control signaling, or downlink control information, or a control element that indicates a duration of the transition time window.

Embodiment 9

The method of embodiments 1 to 8, further comprising: receiving radio resource control signaling, or downlink control information, or a control element that indicates whether the reference signal of the second bandwidth part is cross bandwidth part quasi co-located with a second reference signal of the first bandwidth part.

Embodiment 10

The method of embodiments 1 to 9, wherein the UE locally stores a duration of the transition time window.

Embodiment 11

The method of embodiments 1 to 10, wherein a duration of the transition time window is a function of a periodicity of a second reference signal of the first bandwidth part.

Embodiment 12

The method of embodiments 1 to 11, wherein the reference signal is a CSI-RS, a SSB, or a TRS.

Embodiment 13

The method of embodiments 1 to 12, wherein the indicator is a TCI that indicates a QCL parameter set from a plurality of different QCL parameter sets.

Embodiment 14

The method of embodiments 1 to 13, deriving a TCI state for the first bandwidth part based at least in part on a configured TCI state for the second bandwidth part.

Embodiment 15

The method of embodiments 1 to 14, further comprising: receiving configuration information configuring the UE to utilize a first TCI state for the first bandwidth part of a plurality of different TCI states, and wherein each TCI state of the plurality of TCI states identifies at least one reference signal and includes a parameter for a receive beam configured for receiving a direction transmission in the second bandwidth part; and receiving the transmission in the first bandwidth part in accordance with the first TCI state.

Embodiment 16

The method of embodiments 1 to 15, further comprising: receiving, prior to the grant, a control element configuring the UE to utilize a TCI interpretation in the second bandwidth part; determining that an application time of the control element occurs within the transition time window; and receiving the transmission in the first bandwidth part in accordance with the TCI interpretation.

Embodiment 17

The method of embodiments 1 to 16, further comprising: receiving, prior to the grant, a control element configuring the UE to utilize a TCI interpretation in the second bandwidth part; and determining whether to apply or reject the TCI interpretation for transmissions received in the first bandwidth part during the transition time window based at least in part on an application time of the control element extending after the transition time window.

Embodiment 18

The method of embodiments 1 to 17, further comprising: monitoring a shared data channel or a control channel of the first bandwidth part for the transmission.

Embodiment 19

The method of embodiments 1 to 18, wherein the transmission is a CORESET, and wherein demodulating the transmission in the first bandwidth part during the transition time window further comprises: demodulating the CORESET in the first bandwidth part based at least in part on the QCL assumption.

Embodiment 20

The method of embodiments 1 to 19, wherein the transmission is a first CORESET, and wherein demodulating the transmission in the first bandwidth part during the transition time window further comprises: mapping the first CORESET and a second CORESET in the first bandwidth part; and demodulating the first CORESET and the second CORESET based at least in part on the QCL assumption and the mapping.

Embodiment 21

An apparatus comprising at least one means for performing a method of any of embodiments 1 to 20.

Embodiment 22

An apparatus for wireless communications comprising a processor; memory in electronic communication with the processor; and instructions stored in the memory and executable by the processor to cause the apparatus to perform a method of any of embodiments 1 to 20.

Embodiment 23

A non-transitory computer-readable medium storing code for wireless communications, the code comprising instructions executable by a processor to perform a method of any of embodiments 1 to 20.

Embodiment 24

A method for wireless communication by a base station, comprising: transmitting, to a UE, an indicator indicating to derive a QCL assumption for a DMRS for a first bandwidth part from a reference signal of a second bandwidth part; transmitting a grant in the second bandwidth part instructing the UE to switch from the second bandwidth part to the first bandwidth part; generating a transmission in accordance with the QCL assumption; and transmitting the transmission in the first bandwidth part during a transition time window occurring after the UE is instructed to switch from the second bandwidth part to the first bandwidth part.

Embodiment 25

The method of embodiment 24, wherein a duration of the transition time window corresponds to a duration of a first data channel on the first bandwidth part, the first data channel comprising the transmission in the first bandwidth part.

Embodiment 26

The method of embodiment 24 or 25, further comprising: determining that the transition time window has expired; generating a second transmission in accordance a second QCL assumption corresponding to the first bandwidth part; and transmitting, after the transition time window has expired, the second transmission in the first bandwidth part.

Embodiment 27

The method of embodiment 24 to 26, further comprising: transmitting radio resource control signaling, or downlink control information, or a control element that indicates a duration of the transition time window

Embodiment 28

The method of embodiment 24 to 27, further comprising: transmitting radio resource control signaling, or downlink control information, or a control element that indicates whether the reference signal of the second bandwidth part is cross bandwidth part quasi co-located with a second reference signal of the first bandwidth part.

Embodiment 29

The method of embodiment 24 to 28, further comprising: transmitting the reference signal in the second bandwidth part; and transmitting a second reference signal in the first bandwidth part.

Embodiment 30

The method of embodiment 24 to 29, wherein the reference signal is a CSI-RS, a SSB, or a tracking reference signal.

Embodiment 31

An apparatus comprising at least one means for performing a method of any of embodiments 24 to 30.

Embodiment 32

An apparatus for wireless communications comprising a processor; memory in electronic communication with the processor; and instructions stored in the memory and executable by the processor to cause the apparatus to perform a method of any of embodiments 24 to 30.

Embodiment 33

A non-transitory computer-readable medium storing code for wireless communications, the code comprising instructions executable by a processor to perform a method of any of embodiments 24 to 30.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
    receiving configuration information configuring the UE to utilize, for a first bandwidth part, a first transmission configuration indicator (TCI) state of a plurality of TCI states associated with a second bandwidth part, wherein each TCI state of the plurality of TCI states, including the first TCI state, identifies at least one reference signal and indicates a parameter for a receive beam configured for receiving a transmission in the second bandwidth part, the configuration information indicating to the UE to derive a first quasi co-location (QCL) assumption for a transmission to be transmitted in the first bandwidth part from the at least one reference signal in the second bandwidth part associated with the first TCI state;
    receiving a grant in the second bandwidth part instructing the UE to switch from the second bandwidth part to the first bandwidth part;
    receiving a transmission in the first bandwidth part in accordance with the first TCI state within a transition time window occurring after the UE receives the grant;
    demodulating, based at least in part on the first QCL assumption, the transmission in the first bandwidth part;
    deriving a second QCL assumption for the first bandwidth part from at least one reference signal received in the first bandwidth part; and
    demodulating, after the transition time window has expired, a second transmission in the first bandwidth part based at least in part on the second QCL assumption.

2. The method of claim 1, wherein a duration of the transition time window corresponds to a duration of a first data channel on the first bandwidth part, the first data channel comprising the transmission in the first bandwidth part.

3. The method of claim 1, wherein the indicator indicates that the reference signal of the second bandwidth part is cross bandwidth part quasi co-located with a second reference signal of the first bandwidth part, the method further comprising:
    filtering the reference signal and the second reference signal across the first and second bandwidth parts to determine a QCL parameter, wherein the transmission in the first bandwidth part is demodulated based at least in part on the QCL parameter.

4. The method of claim 1, wherein the indicator indicates that the reference signal of the second bandwidth part is not cross bandwidth part quasi co-located with a second reference signal of the first bandwidth part, the method further comprising:
determining not to filter the reference signal and the second reference signal across the first and second bandwidth parts.

5. The method of claim 1, wherein the QCL assumption indicates to derive a QCL parameter for the first bandwidth part based at least in part on the reference signal of the second bandwidth part, and wherein the transmission in the first bandwidth part is demodulated based at least in part on the QCL parameter.

6. The method of claim 5, wherein the QCL parameter is a delay spread parameter, a Doppler parameter, an average delay parameter, a Doppler shift parameter, a spatial receive parameter, or any combination thereof.

7. The method of claim 1, further comprising:
receiving radio resource control signaling, or downlink control information, or a control element that indicates a duration of the transition time window.

8. The method of claim 1, further comprising:
receiving radio resource control signaling, or downlink control information, or a control element that indicates whether the reference signal of the second bandwidth part is cross bandwidth part quasi co-located with a second reference signal of the first bandwidth part.

9. The method of claim 1, wherein the UE locally stores a duration of the transition time window.

10. The method of claim 1, wherein a duration of the transition time window is a function of a periodicity of a second reference signal of the first bandwidth part.

11. The method of claim 1, wherein the reference signal is a channel state information reference signal (CSI-RS), a synchronization signal block (SSB), or a tracking reference signal (TRS).

12. The method of claim 1, wherein the indicator is a transmission configuration indicator (TCI) that indicates a QCL parameter set from a plurality of different QCL parameter sets.

13. The method of claim 1, further comprising:
deriving a transmission configuration indicator (TCI) state for the first bandwidth part based at least in part on a configured TCI state for the second bandwidth part.

14. The method of claim 1, further comprising:
receiving, prior to the grant, a control element configuring the UE to utilize a transmission configuration indicator (TCI) interpretation in the second bandwidth part;
determining that an application time of the control element occurs within the transition time window; and
receiving the transmission in the first bandwidth part in accordance with the TCI interpretation.

15. The method of claim 1, further comprising:
receiving, prior to the grant, a control element configuring the UE to utilize a transmission configuration indicator (TCI) interpretation in the second bandwidth part; and
determining whether to apply or reject the TCI interpretation for transmissions received in the first bandwidth part during the transition time window based at least in part on an application time of the control element extending after the transition time window.

16. The method of claim 1, further comprising:
monitoring a shared data channel or a control channel of the first bandwidth part for the transmission.

17. The method of claim 1, wherein the transmission is a control resource set (CORESET), and wherein demodulating the transmission in the first bandwidth part during the transition time window further comprises:
demodulating the CORESET in the first bandwidth part based at least in part on the QCL assumption.

18. The method of claim 1, wherein the transmission is a first control resource set (CORESET), and wherein demodulating the transmission in the first bandwidth part during the transition time window further comprises:
mapping the first CORESET and a second CORESET in the first bandwidth part; and
demodulating the first CORESET and the second CORESET based at least in part on the QCL assumption and the mapping.

19. An apparatus for wireless communication by a user equipment (UE), comprising:
means for receiving configuration information configuring the UE to utilize, for a first bandwidth part, a first transmission configuration indicator (TCI) state of a plurality of TCI states associated with a second bandwidth part, wherein each TCI state of the plurality of TCI states, including the first TCI state, identifies at least one reference signal and indicates a parameter for a receive beam configured for receiving a transmission in the second bandwidth part, the configuration information indicating to the UE to derive a first quasi co-location (QCL) assumption for a transmission to be transmitted in the first bandwidth part from the at least one reference signal in the second bandwidth part associated with the first TCI state;
means for receiving a grant in the second bandwidth part instructing the UE to switch from the second bandwidth part to the first bandwidth part;
means for receiving a transmission in the first bandwidth part in accordance with the first TCI state within a transition time window occurring after the UE receives the grant;
means for demodulating, based at least in part on the first QCL assumption, the transmission in the first bandwidth part;
means for deriving a second QCL assumption for the first bandwidth part from at least one reference signal received in the first bandwidth part; and
means for demodulating, after the transition time window has expired, a second transmission in the first bandwidth part based at least in part on the second QCL assumption.

20. An apparatus for wireless communication by a user equipment (UE), comprising:
a processor;
memory in electronic communication with the processor; and
instructions stored in the memory and executable by the processor to cause the apparatus to:
receive configuration information configuring the UE to utilize, for a first bandwidth part, a first transmission configuration indicator (TCI) state of a plurality of TCI states associated with a second bandwidth part, wherein each TCI state of the plurality of TCI states, including the first TCI state, identifies at least one reference signal and indicates a parameter for a receive beam configured for receiving a transmission in the second bandwidth part, the configuration information indicating to the UE to derive a first quasi co-location (QCL) assumption for a transmission to be transmitted in the first bandwidth part from the at least one reference signal in the second bandwidth part associated with the first TCI state;

receive a grant in the second bandwidth part instructing the UE to switch from the second bandwidth part to the first bandwidth part;

receive a transmission in the first bandwidth part in accordance with the first TCI state within a transition time window occurring after the UE receives the grant;

demodulate, based at least in part on the first QCL assumption, the transmission in the first bandwidth part;

derive a second QCL assumption for the first bandwidth part from at least one reference signal received in the first bandwidth part; and demodulate, after the transition time window has expired, a second transmission in the first bandwidth part based at least in part on the second QCL assumption.

21. The apparatus of claim 20, wherein the indicator indicates that the reference signal of the second bandwidth part is cross bandwidth part quasi co-located with a second reference signal of the first bandwidth part, and wherein the instructions are further executable by the processor to cause the apparatus to:

filter the reference signal and the second reference signal across the first and second bandwidth parts to determine a QCL parameter, wherein the transmission in the first bandwidth part is demodulated based at least in part on the QCL parameter.

22. The apparatus of claim 20, wherein the indicator indicates that the reference signal of the second bandwidth part is not cross bandwidth part quasi co-located with a second reference signal of the first bandwidth part, and wherein the instructions are further executable by the processor to cause the apparatus to:

determine not to filter the reference signal and the second reference signal across the first and second bandwidth parts.

23. The apparatus of claim 20, wherein the instructions are further executable by the processor to cause the apparatus to:

determine that the transition time window has expired;

derive a second QCL assumption for the DMRS for the first bandwidth part from a reference signal of the first bandwidth part; and demodulate, after the transition time window has expired, a second transmission in the first bandwidth part based at least in part on the second QCL assumption.

24. The apparatus of claim 20, wherein the QCL assumption indicates to derive a QCL parameter for the first bandwidth part based at least in part on the reference signal of the second bandwidth part, and wherein the transmission in the first bandwidth part is demodulated based at least in part on the QCL parameter.

25. The apparatus of claim 24, wherein the QCL parameter is a delay spread parameter, a Doppler parameter, an average delay parameter, a Doppler shift parameter, a spatial receive parameter, or any combination thereof.

26. The apparatus of claim 20, wherein the instructions are further executable by the processor to cause the apparatus to:

receive radio resource control signaling, or downlink control information, or a control element that indicates a duration of the transition time window.

27. The apparatus of claim 20, wherein the instructions are further executable by the processor to cause the apparatus to:

receive radio resource control signaling, or downlink control information, or a control element that indicates whether the reference signal of the second bandwidth part is cross bandwidth part quasi co-located with a second reference signal of the first bandwidth part.

28. The apparatus of claim 20, wherein the UE locally stores a duration of the transition time window.

29. The apparatus of claim 20, wherein a duration of the transition time window is a function of a periodicity of a second reference signal of the first bandwidth part.

30. The apparatus of claim 20, wherein the reference signal is a channel state information reference signal (CSI-RS), a synchronization signal block (SSB), or a tracking reference signal (TRS).

31. The apparatus of claim 20, wherein the indicator is a transmission configuration indicator (TCI) that indicates a QCL parameter set from a plurality of different QCL parameter sets.

32. The apparatus of claim 20, wherein the instructions are further executable by the processor to cause the apparatus to:

derive a transmission configuration indicator (TCI) state for the first bandwidth part based at least in part on a configured TCI state for the second bandwidth part.

33. The apparatus of claim 20, wherein the instructions are further executable by the processor to cause the apparatus to:

receive, prior to the grant, a control element configuring the UE to utilize a transmission configuration indicator (TCI) interpretation in the second bandwidth part;

determine that an application time of the control element occurs within the transition time window; and receive the transmission in the first bandwidth part in accordance with the TCI interpretation.

34. The apparatus of claim 20, wherein the instructions are further executable by the processor to cause the apparatus to:

receive, prior to the grant, a control element configuring the UE to utilize a transmission configuration indicator (TCI) interpretation in the second bandwidth part; and determine whether to apply or reject the TCI interpretation for transmissions received in the first bandwidth part during the transition time window based at least in part on an application time of the control element extending after the transition time window.

35. The apparatus of claim 20, wherein the instructions are further executable by the processor to cause the apparatus to:

monitor a shared data channel or a control channel of the first bandwidth part for the transmission.

36. The apparatus of claim 20, wherein the instructions to the transmission is a control resource set (CORESET), and wherein demodulating the transmission in the first bandwidth part during the transition time window further are executable by the processor to cause the apparatus to:

demodulate the CORESET in the first bandwidth part based at least in part on the QCL assumption.

37. The apparatus of claim 20, wherein the instructions to the transmission is a first control resource set (CORESET), and wherein demodulating the transmission in the first bandwidth part during the transition time window further are executable by the processor to cause the apparatus to:

map the first CORESET and a second CORESET in the first bandwidth part; and demodulate the first CORESET and the second CORESET based at least in part on the QCL assumption and the mapping.

38. A method for wireless communication by a user equipment (UE), comprising:

receiving, from a base station, an indication of a first transmission configuration indicator (TCI) state of a set of TCI states associated with a first bandwidth part, each TCI state being associated with a respective set of reference signals and indicating a quasi co-location (QCL) relationship associated with the set of reference signals;

determining, based at least in part on the indication of the first TCI state, that one or more antenna ports associated with receiving one or more first reference signals in the first bandwidth part are quasi co-located with one or more antenna ports associated with receiving one or more second reference signals, data or control information in a second bandwidth part;

receiving, from the base station, the one or more first reference signals in the first bandwidth part;

determining one or more first QCL parameters for the first bandwidth part based on the one or more first reference signals;

determining to switch from the first bandwidth part to the second bandwidth part;

receiving, from the base station, the one or more second reference signals, the data or the control information, or a combination thereof, in the second bandwidth part after switching to the second bandwidth part;

demodulating, prior to processing any other reference signal in the second bandwidth part after switching to the second bandwidth part, at least a portion of the one or more second reference signals, the data or the control information, or the combination thereof, in the second bandwidth part based on the one or more first QCL parameters;

receiving, from the base station, one or more third reference signals in the second bandwidth part after demodulating the portion of the one or more second reference signals, the data or the control information, or the combination thereof, in the second bandwidth part based on the one or more first QCL parameters;

determining one or more second QCL parameters for the second bandwidth part based on the one or more third reference signals;

receiving, from the base station, one or more fourth reference signals, second data or second control information, or a combination thereof, in the second bandwidth part after receiving the one or more third reference signals; and demodulating the one or more fourth reference signals, the second data or the second control information, or the combination thereof, in the second bandwidth part based on the one or more second QCL parameters.

39. The method of claim 38, further comprising receiving, from the base station, downlink control information that schedules the one or more second reference signals, the data or the control information in the second bandwidth part or that includes a request for the UE to switch from the first bandwidth part to the second bandwidth part, wherein the determination to switch to the second bandwidth part is based on receiving the downlink control information.

40. The method of claim 38, wherein the determination to switch to the second bandwidth part is based on an expiration of a timer associated with one or both of the first bandwidth part or the second bandwidth part.

41. The method of claim 38, wherein the one or more second reference signals, the data or the control information is received in the second bandwidth part within a transition time window after switching, or determining to switch, to the second bandwidth part, and wherein the demodulation of the one or more second reference signals, the data or the control information in the second bandwidth part based on the one or more QCL parameters is based on receiving the one or more second reference signals, the data or the control information before an end of the transition time window.

42. The method of claim 41, further comprising receiving, from the base station, an indication of a length or a duration of the transition time window.

43. The method of claim 38, wherein the data or the control information includes an indication of a second TCI state, and wherein the reception of the one or more third reference signals or the determination of the one or more second QCL parameters is based on the second TCI state.

44. The method of claim 38, wherein the determination of the one or more QCL parameters for receiving the one or more second reference signals, the data or the control information in the second bandwidth part is not based on receiving any reference signals in the second bandwidth part.

45. The method of claim 38, further comprising receiving an indication in radio resource control signaling, a medium access control control element, or downlink control information that indicates that one or more antenna ports associated with transmitting the one or more first reference signals in the first bandwidth part are quasi co-located with one or more antenna ports associated with transmitting the one or more second reference signals, the data or the control information in the second bandwidth part.

* * * * *